United States Patent [19]
Silvey

[11] Patent Number: 4,643,050
[45] Date of Patent: * Feb. 17, 1987

[54] SAW CHAIN DEPTH GAUGE GRINDER

[76] Inventor: E. Ray Silvey, 1231 Dutton Rd., Eagle Point, Oreg. 97524

[*] Notice: The portion of the term of this patent subsequent to Jun. 11, 2002 has been disclaimed.

[21] Appl. No.: 742,715

[22] Filed: Jun. 7, 1985

Related U.S. Application Data

[63] Continuation-in-part of Ser. No. 544,435, Oct. 21, 1983, Pat. No. 4,522,087.

[51] Int. Cl.[4] .............................................. B23D 63/16
[52] U.S. Cl. ........................................ 76/25 A; 76/42
[58] Field of Search .................... 76/25 A, 40, 37, 42, 76/75, 77

[56] References Cited
U.S. PATENT DOCUMENTS

| 3,717,051 | 2/1973 | Silvey | 76/37 |
| 3,796,113 | 3/1974 | Granberg | 76/74 |
| 4,002,089 | 1/1977 | Granberg | 76/37 |
| 4,267,751 | 5/1981 | Ziegelmeyer | 76/25 |
| 4,522,087 | 6/1985 | Silvey | 76/25 |

Primary Examiner—Roscoe V. Parker
Attorney, Agent, or Firm—Eugene M. Eckelman

[57] ABSTRACT

A machine for grinding the depth gauges of saw chain cutter links includes a saw chain carrier mounted for movement toward and away from a power grinding element. As the carrier moves a cutter link toward the grinding element, the cutter tooth of such link moves beneath indexing structure which includes a shield plate which then moves with the carrier toward the grinding element. Upon continued movement, the shield plate contacts an indexing roller which forces the plate down against the top of the tooth. After the plate bottoms against the tooth, the plate forces the indexing roller upwardly. The roller, being linked to the grinding element, lifts the grinding element to its grinding position for grinding the depth gauge of such link. An alternative embodiment includes a brake activated by the carrier to hold the grinding element in its grinding position after the cutter tooth passes beneath the indexing roller. In another embodiment of the invention, indexing structure includes a slide plate having a hook portion engageable with a side cutting edge of a cutter tooth and associated with ramps which provide selected levels of grinding without contacting the top cutting edge of the tooth. A further embodiment uses a slide plate associated with levers to position the level of grinding also without contacting the top cutting edge of the tooth.

14 Claims, 25 Drawing Figures

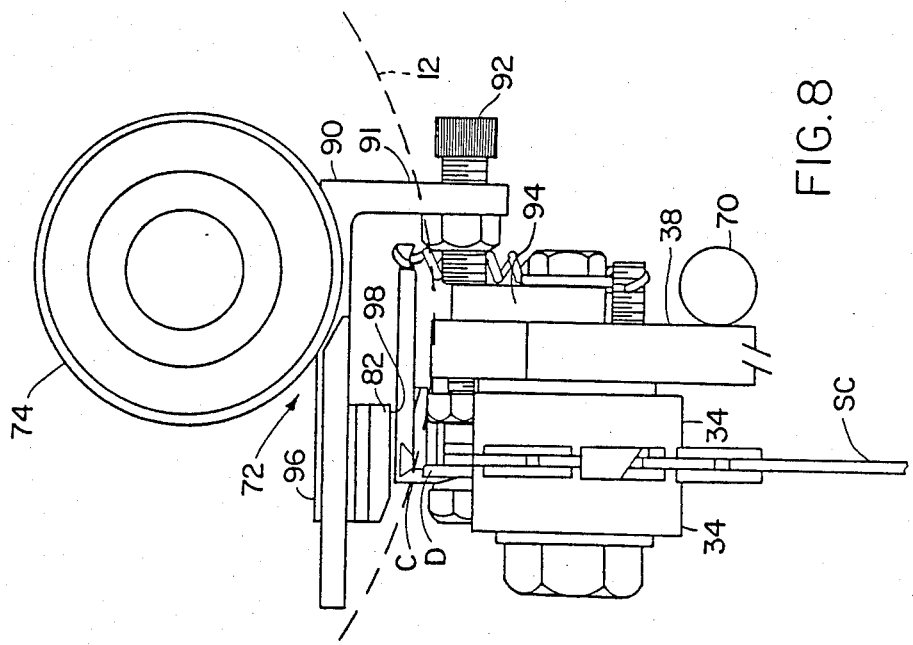
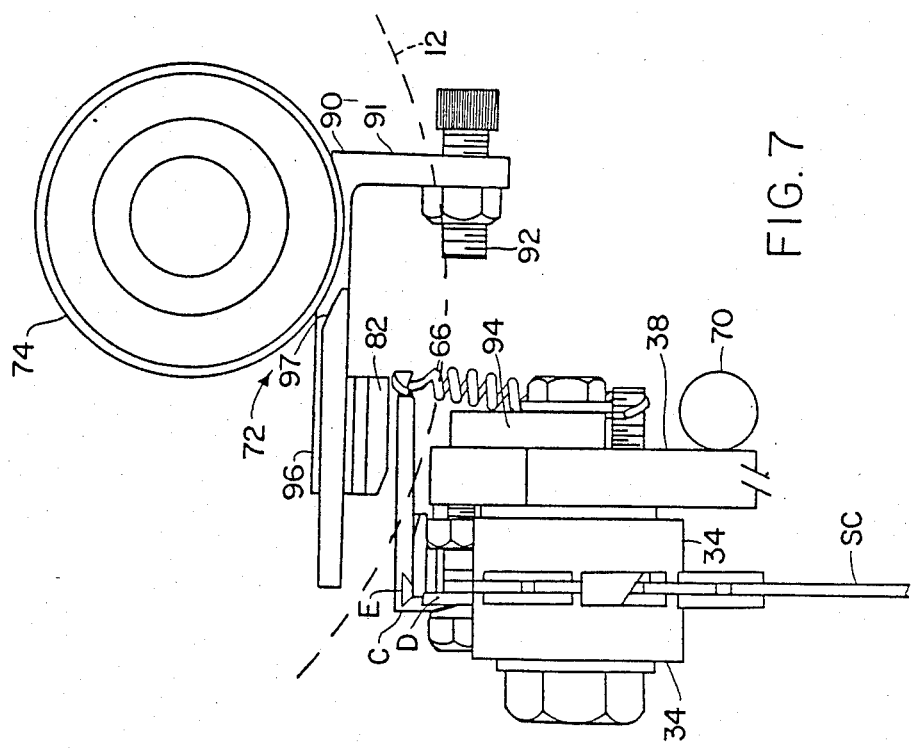

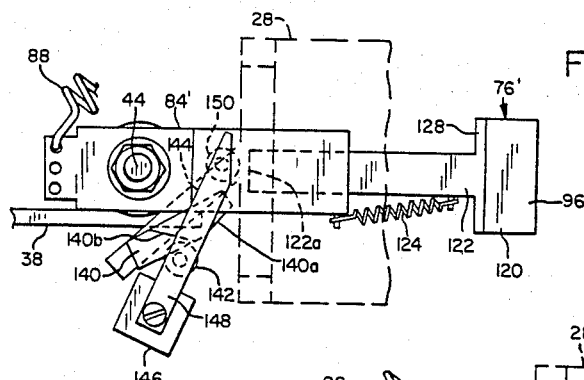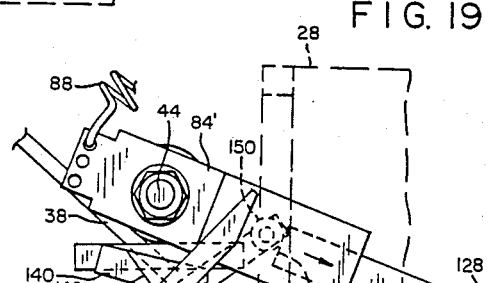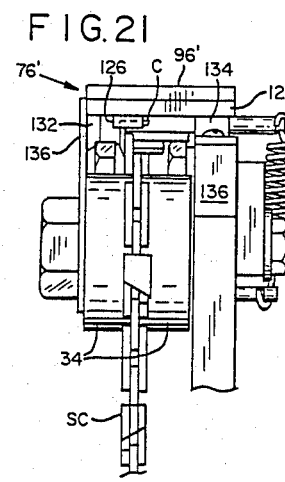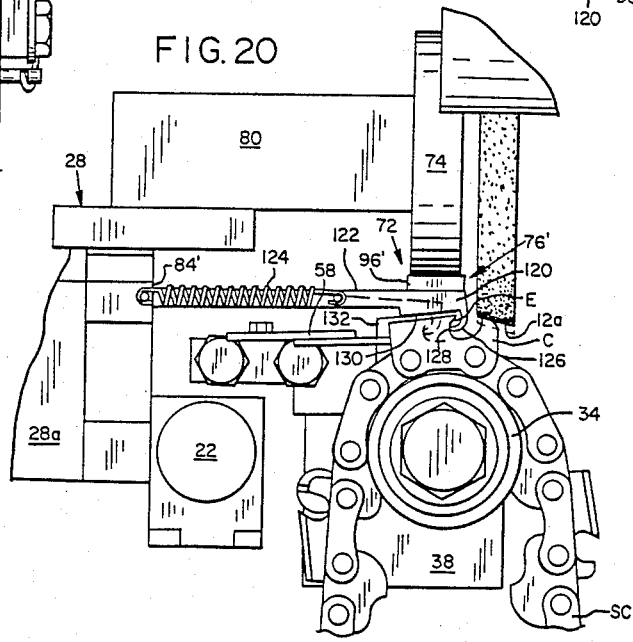

SAW CHAIN DEPTH GAUGE GRINDER

REFERENCE TO PRIOR APPLICATIONS

This application is a continuation-in-part of application Ser. No. 544,435, filed Oct. 21, 1983, now Pat. No. 4,522,087.

BACKGROUND OF THE INVENTION

The present invention relates to machines for frinding saw chains and more particularly to a machine for grinding the depth gauges of saw chain cutter links.

Saw chains typically include alternating rignt-and left-hand cutter links of similar but opposite configuration interconnected by drive links and tine straps. Each cutter link includes a cutter tooth or blade with top and side cutting edges and a depth of penetration of the top cutting edge into the wood. There is a predetermined desired vertical distance or "clearance" between the top cutting edge and the top of the depth gauge. With repeated sharpenings of the cutting edges, the cutter tooth becomes shorter, thereby reducing depth gauge clearance. Thus, as the tooth becomes shorter, the height of the depth gauge should be reduced so as to maintain a desired clearance.

In the past, depth gauge clearance has been maintained most often by hand filing. File guides have long been available for this purpose. Typically, the file guide is supported on top of the cutter tooth and extends forwardly therefrom over the depth gauge with a slot in the guide through which an upper portion of the depth gauge protrudes if the depth gauge is too high for a given height of cutter tooth. The user then simply wipes a flat file across the file guide to remove the protruding metal from the top of the depth gauge until the depth gauge is flush with the guide surface. Typical such file guides are shown, for example, in U.S. Pat. Nos. 2,622,338; 2,705,376, and 3,365,805.

Others have devised power grinders for grinding depth gauges to a desired height relative to its cutter tooth. Silvey U.S. Pat. No. 3,717,051 discloses a depth gauge grinder which has been made available commercially in both manual and automatic versions. In such grinder, the grinding wheel is preset to grind a desired clearance by measuring from the top of a selected cutter tooth. Then all depth gauges on the saw chain are ground with the grinding wheel at the same preset position. If the cutter teeth of all cutter links of the saw chain are of about the same length so that the top cutting edges of the cutter teeth are all at about the same height, such grinder will grind all depth gauges to about the same clearance. However, many persons who use and sharpen saw chains do not always maintain all cutter teeth of their saw chains at about the same length, although this is highly recommended. Where different cutter teeth of a saw chain are of widely differing lengths, the Silvey grinder will produce different depth gauge clearances on different cutter links depending on the length of the tooth.

Other depth gauge grinders have been devised which determine depth gauge clearance by measuring or indexing from the top of each cutter tooth. For example, Granberg U.S. Pat. Nos. 3,796,113 and 4,002,089 disclose a power-operated depth gauge grinder for use in grinding depth gauges while the saw chain remains on the bar of the chain saw. A guide plate attached to the grinder is supported on the top of the cutter tooth of the cutter link while the grinding element lowers the depth gauge of the same link as determined by the vertical distance between the bottom surface of the guideplate and the grinding surface of the element.

Ziegelmeyer U.S. Pat. No. 4,267,751 discloses a power-operated depth gauge grinder which operates on a principle similar to that of the aforementioned Granberg patents but with the saw chain removed from the chain saw bar and mounted on the saw chain support of a grinding machine. As each cutter link is advanced toward the grinding wheel, the top of the cutter tooth of such link engages a preset guide plate which depresses the saw chain support so that a depth gauge is brought into contact with the grinding wheel at an elevation that will grind the depth gauge to the desired preset clearance. Thus, the Ziegelmeyer device, like those of Granberg and prior file guides, determines depth gauge clearance for each cutter link by indexing from the cutter tooth of the same link.

The advantages of the hand file guides and prior Granberg and Ziegelmeyer depth gauge grinders over, for example, the aforementioned Silvey depth gauge grinder, is that the former will produce a fairly uniform depth gauge clearance on all cutter links of a chain regardless of wide variations in the lengths of the cutter teeth of that chain. However, they have no advantage over the Silvey depth gauge grinder in instances where all cutter teeth of a saw chain are maintained at approximately the same length, as recommended.

All of the aforementioned types of power-operated depth gauge grinders and all other known depth gauge grinders have two principal drawbacks.

First, depth gauge grinders of the Granberg and Ziegelmeyer types have guide plates or indexing means which rub across the top cutting edge of the cutter tooth during the grinding operation and therefore have a tendency to dull the previously sharpened cutter tooth. In this regard, it is universal practice to sharpen the cutter teeth before lowering the depth gauges so that the depth gauge clearance is determined relative to the sharpened cutter tooth with which it works.

Second, none of the aforementioned depth gauge grinders provide for any automatic compensation to increase depth gauge clearance as the cutter tooth becomes shorter. Experts in sharpening saw chains agree that as a cutter tooth becomes shorter with repeated sharpenings, depth gauge clearance should be increased to compensate for the increasing longitudinal distance between the depth gauge and the cutting edge. As a saw chain travels at high speed about a saw bar, there is a tendency for the forward end of each cutter link to ride higher than the rear end. This is caused by two factors. One is the tendency of the rear end of the lower edge of a cutter link to wear faster than the forward end. The other is the tendency of the forward end to be lifted as it is pulled about the saw bar. The combination of this lifting effect on the forward portion of the cutter link and the greater wear on the rear lower edge in effect raises the depth gauge relative to the cutting edge of a link, producing an effective reduced clearance which becomes more noticeable as the distance between the depth gauge and the cutting edge increases. To compensate for this, some experts advise that the measured depth gauge clearance on a cutter link with a worn cutter tooth should be up to ten thousandths of an inch greater than on a link with a new cutter tooth. None of the aforementioned depth gauge grinders automatically compensate for this need for increased clearance as the cutter tooth wears back.

Third, none of the aforementioned depth gauge grinders are capable, without adjustment, of providing the right-hand cutter links with a different depth gauge clearance than the left-hand cutter links of the same chain when desired. In practice, it has been found that with chain saws on which the motors are offset on the left-hand side of the saw bar, as is commonly the case, the saw chain tends to run to the right when cutting wood. It is believed that the reverse effect would be true if the motor is offset to the right-hand side of the saw. To compensate for the tendency of a saw chain to "run to the right", which means the left-hand cutters are outcutting the right-hand cutters of the saw chain, the clearance of the depth gauges of the left-hand cutters should be reduced or the clearance of the right-hand cutters increased. None of the mentioned power depth gauge grinders are capable of accomplishing this without an adjustment of the grinding machine itself.

Accordingly, there is a need for a power-operated depth gauge grinder which overcomes the aforementioned drawbacks of prior power grinders while maintaining their advantages of fast and accurate depth gauge grinding.

A primary objective of the invention, therefore, is to provide a depth gauge grinding machine which automatically increases the depth gauge clearance of a cutter link as the cutter tooth of that link becomes shorter through repeated sharpenings.

Another primary object of the invention is to provide a depth gauge grinder as aforesaid which is capable, without adjustment, of grinding the depth gauges of the right-hand cutter links to a different clearance than the depth gauges of the left-hand cutter links.

Still another primary object of the invention is to provide a depth gauge grinder as aforesaid which determines depth gauge clearance by gauging from the top cutting edge of its associated cutter tooth, but without any direct rubbing contact between the gauging or indexing means and the cutting edge so that the cutting edge will remain sharp during the depth gauge grinding operation.

Other objectives of the invention are to provide a depth gauge grinder as aforesaid which is simple to operate, has a minimum of adjustments, is economical to operate and maintain, and is adaptable to automatic operation.

Still another objective is to provide a depth gauge grinder as aforesaid which does not require the indexing means to remain in contact with the top of the cutter tooth while the depth gauge is ground.

The foregoing and other objects, features, and advantages of the present invention will become apparent from the following detailed description which proceeds with reference to the accompanying drawings.

SUMMARY OF THE INVENTION

The foregoing objectives are carried out in accordance with the invention by providing a saw chain depth gauge grinder in which the saw chain is mounted on a carrier means with the cutter link containing the depth gauge to be ground in a predetermined position for grinding, and with the carrier means and grinding means being relatively movable along a predetermined path to move the depth gauge toward and away from the grinding means. During such relative movement, an indexing means positioned along the path and cooperable with the cutter tooth associated with the depth gauge to be ground, induces generally vertical relative movement between the grinding means and the carrier means to determine the desired grinding position of the grinding surface of the grinding means relative to the depth gauge. During relative movement along such path, a shield means is engaged by the indexing means and forced into contact with the top of the cutter tooth to prevent direct rubbing contact between the indexing means and the cutter tooth. Thus, indexing actually occurs through direct contact between the shield means and the indexing means rather than through direct contact between the indexing means and the top of the cutter tooth.

The grinder may include clearance adjustment means cooperable with the indexing means and the top of the cutter tooth operable automatically to increase depth gauge clearance as the cutter tooth becomes shorter. Such clearance adjustment means may include means causing the top of the cutter tooth to contact an indexing surface at a compensating angle that is greater than the back slope angle of the top of the cutter tooth. The clearance adjustment means may include means on the carrier means for disposing the selected cutter link at an angle relative to the indexing surface thereby to define at least a portion of the compensating angle. The indexing surface may also be inclined upwardly in a direction rearwardly from the top cutting edge of the cutter tooth relative to the bottom edge of the cutter link to at least partially define the compensating angle.

The grinder of the invention may also include clearance compensating means cooperable with the indexing means and the tops of the alternating right and left-hand cutter teeth for automatically grinding the depth gauges of the right-hand cutter links to a different clearance than the depth gauges of the left-hand cutter links. Such clearance compensating means may include a laterally-sloping indexing surface contactable by the tops of the cutter teeth during relative movement of the carrier means and grinding means along their path of relative movement and cooperable with the indexing means. Such surface slopes laterally of the saw chain on the carrier means so that the surface contacts the tops of the right-hand cutter teeth at a different level than that at which it contacts the left-hand cutter teeth.

The invention may also include means for disengaging the indexing means from the shield means and the shield means from the top of the cutter tooth before grinding each depth gauge so as to minimize contact between the cutter tooth and grinding machine elements and thus minimize the possibility of dulling the cutting edge of the cutter tooth.

Furthermore, the invention may include indexing means having a slide plate with a hook portion engageable with a side cutting edge of a cutter tooth and associated with ramps which provide selected levels of grinding without contacting the top cutting edge of the tooth. Also, an embodiment may employ a slide plate associated with levers to position the level of grinding, also without contacting the top cutting edge of the tooth.

BRIEF DESCRIPTION OF DRAWINGS

FIG. 7 is a front elevational view of a portion of the grinder elements shown in FIG. 2 on an enlarged scale and showing the saw chain carrier in its most retracted position;

FIG. 8 is a view similar to FIG. 7 but showing the saw chair carrier approaching its grinding position;

FIG. 18 is a fragmentary, partly diagrammatic view showing advancing and retracting structure associated with tooth engaging means of the FIG. 17 embodiment for automatically controlling the grinding clearance of the depth gauges relative to the length of the cutter teeth, this view showing the position of movable parts in grinding position;

FIG. 19 is a view similar to FIG. 18 but showing the position of the movable parts when the carrier arm for the saw chain is swung outwardly away from the grinding wheel;

FIG. 20 is an enlarged partial side elevational view of the apparatus of FIG. 17 in grinding position;

FIG. 21 is an enlarged partial front elevational view of the apparatus of FIG. 17 also in grinding position;

DETAILED DESCRIPTION OF PREFERRED EMBODIMENTS

Figure 1:
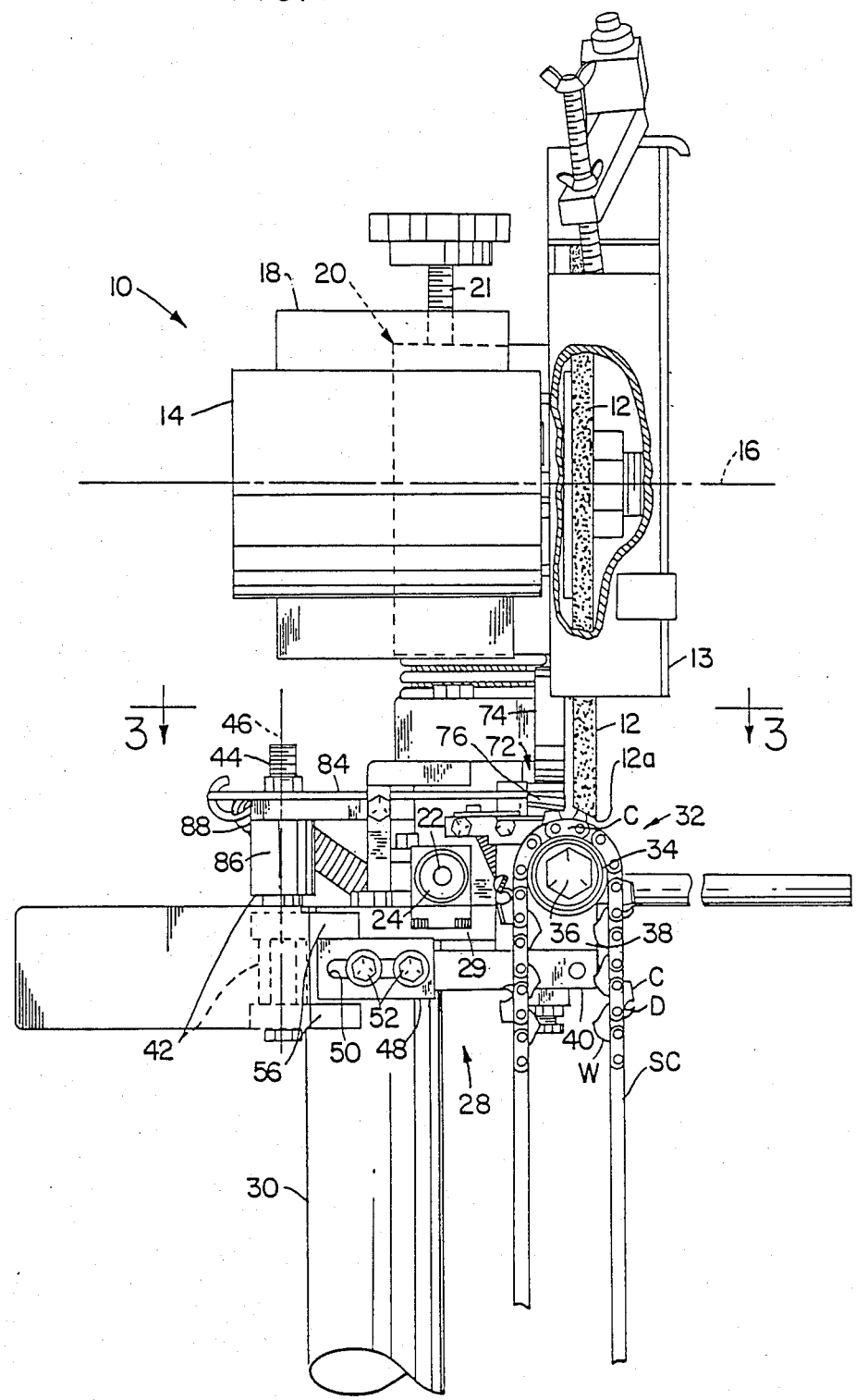
FIG. 1 is a side elevational view of a depth gauge grinding machine in accordance with the invention mounted on a stand, lower portion of which is omitted.

Referring first to FIGS. 1-6 of the drawings, a saw chain depth gauge grinder 10 in accordance with the invention includes a grinding means in the form of a grinding wheel 12 shielded by a wheel guard 13 and driven by an electric motor 14. The motor is mounted for rotating the wheel about a generally horizontal axis 16. Motor 14 includes a motor housing 18 secured at one side to a vertically extending slide means 20. Slide means 20 pivotally mounts the grinding wheel assembly described to a pivot shaft 22 rotatably mounted in bearings 24 carried by bearing blocks 26 secured to a stationary frame 28, for limited pivoting movement about a generally horizontal axis 23. Axis 23 lies in a vertical plane which is perpendicular to the vertical plane of grinding wheel axis 16. Frame 28 includes a horizontal platform portion 29 secured to a stationary support column 30 supported on a base (not shown) at ground level in a well known manner.

Slide means 20 operates to move the grinding wheel assembly vertically and thus adjust the level of the grinding surface 12a of the grinding wheel relative to the stationary frame 28. Slide 20 is of known construction as disclosed in Silvey U.S. Pat. No. 3,779,103. Briefly, it includes a slide bar 20a secured to pivot shaft 22 and slidably received within a slide casing 20b. An adjusting screw 21 threaded through the top of casing 20b engages the top of slide bar 20a. Because casing 20b is secured to motor housing 18, turning of screw 21 clockwise elevates the grinding wheel assembly. A tension spring 25 lowers the assembly when screw 21 is turned counterclockwise.

Also supported on the frame is a saw chain carrier means shown generally at 32. The carrier means is adapted to support a continuous loop of saw chain SC with a cutter link C of the chain positioned for grinding the depth gauge D of such link and such that the cutter tooth T of the same link interacts with indexing means to determine depth gauge clearance.

Figure 2:
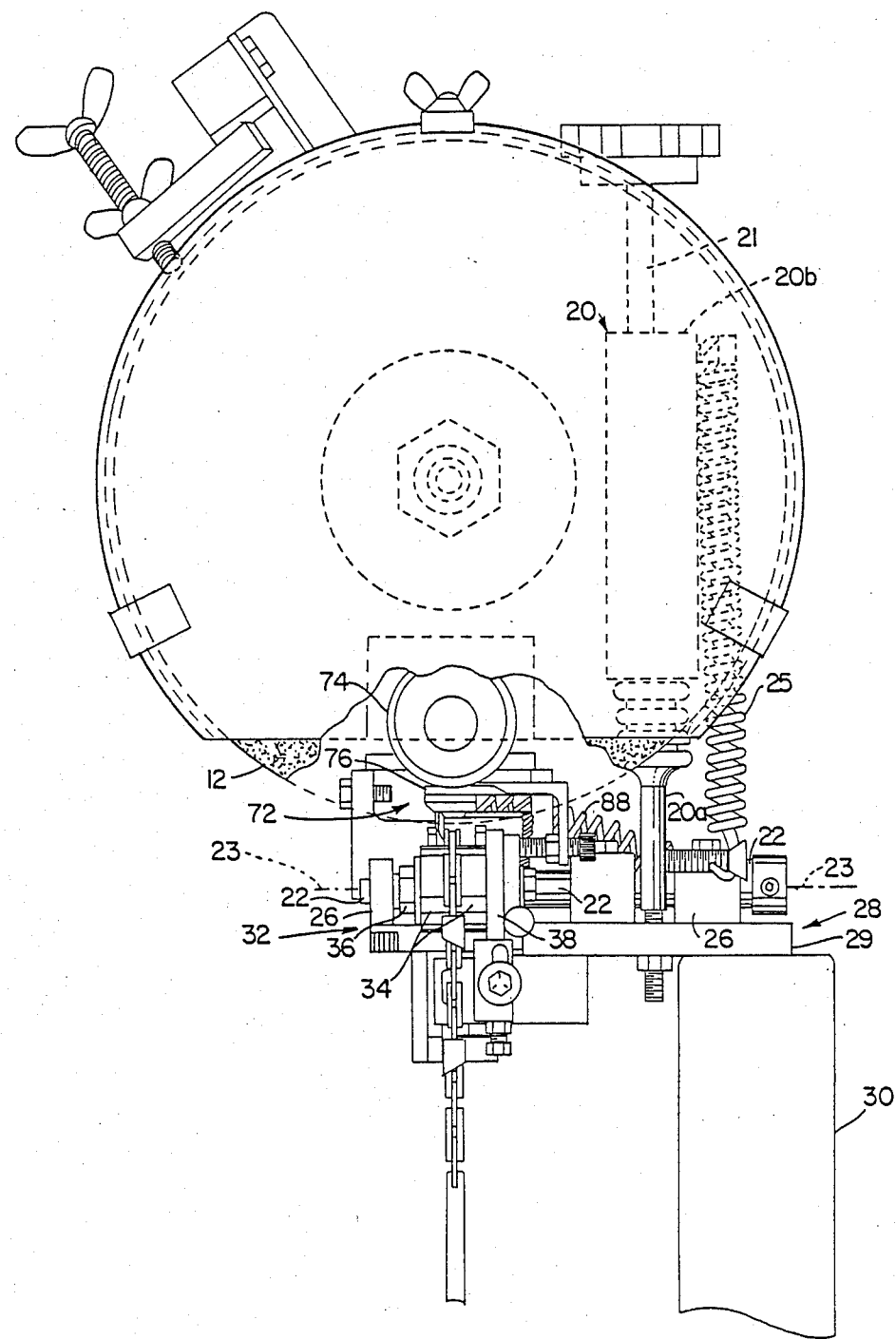
FIG. 2 is a front elevational view of the depth gauge grinding machine of FIG. 1.

The carrier means includes an upper pair of saw chain support rollers 34 and a similar lower pair of support rollers (not shown) supported from a lower portion of support column 30 in a well known manner such as shown, for example, in prior Silvey U.S. Pat. No. 3,717,051. Saw chain support rollers 34, as shown best in FIG. 2, are actually ball bearings which are mounted side-by-side in slightly spaced apart relationship so as to receive snugly in the gap therebetween the center drive links of a saw chain. The side links, including cutter links and tie straps of the saw chain, ride on the rotatable peripheral surfaces of the rollers.

Figure 4:
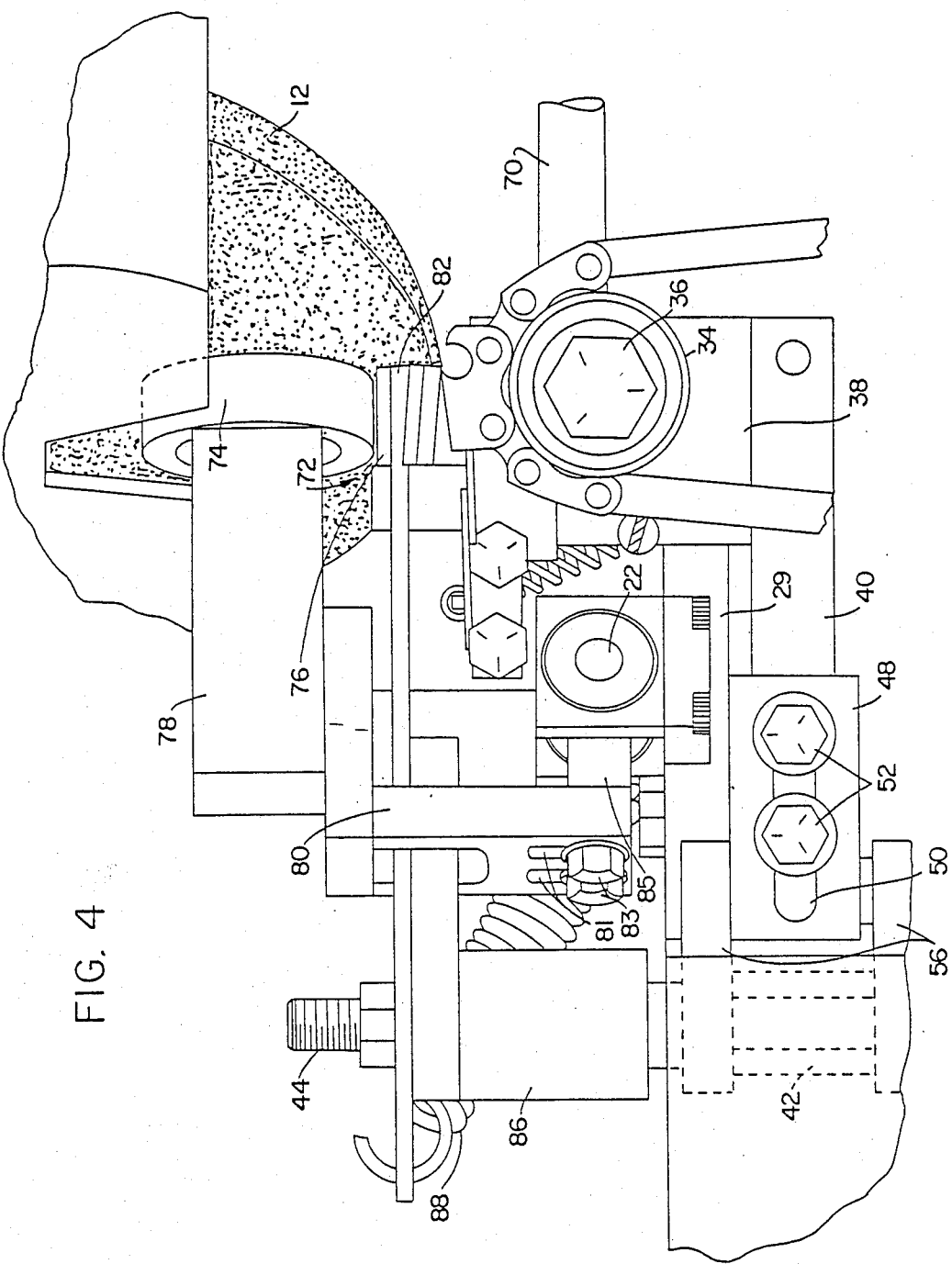
FIG. 4 is an enlarged partial side elevational view of a portion of the machine of FIG. 1 in grinding position.

As shown best in FIG. 4, the stationary inner portions of rollers 34 are secured by a screw 36 to a carrier plate 38 extending upwardly from a carrier arm 40. Carrier arm 40 extends generally horizontally to a pivot connection 42 with an upright pivot shaft 44 for pivoting movement of the chain support rollers 34 about a generally upright pivot axis 46. Carrier arm 40 includes an enlarged arm portion 48 which slidingly receives main arm 40. Arm portion 48 is slotted at 50. A pair of bolts 52 extending through arm 40 at the slots 50 lock arm 40 in various adjusted portions along the slots to provide for a length adjustment of the carrier arm. Enlarged slide portion 48 is in turn secured to the upper and lower clevis members 56 which are attached to the upper and lower ends of journal bearing 42 to rotatably support the carrier arm on upright pivot shaft 44. Pivot shaft 44 is secured to the stationary frame 28.

Although not clearly shown, upright carrier plate 38 is vertically adjustable on carrier arm 40 in a manner similar to the longitudinal adjustment of carrier arm 40. The objective, of course, is to be able to properly position a cutter link C in alignment both horizontally and vertically with the lower grinding surface 12a of grinding wheel 12. This alignment will vary, of course, with saw chains of different sizes and pitches, necessitating such adjustments.

Figure 5:
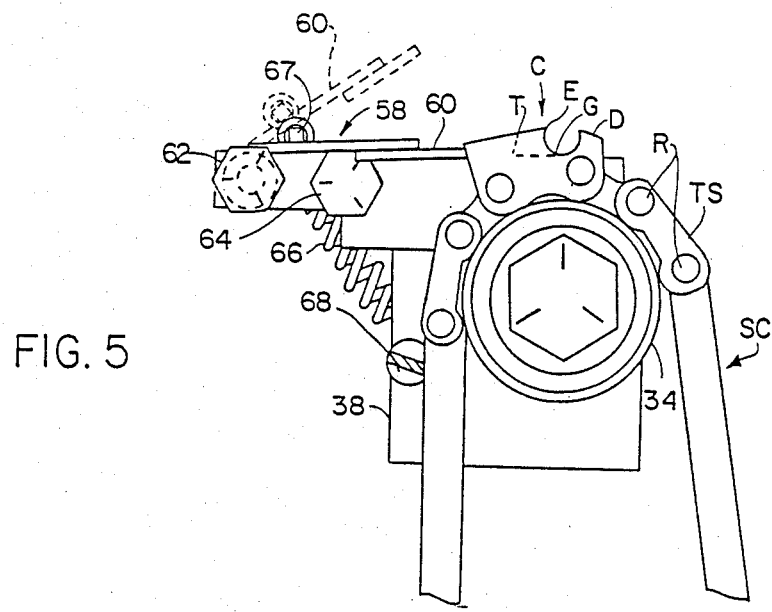
FIG. 5 is a partial elevational view of the saw chain carrier portion of the machine of FIG. 1 on an enlarged scale with the carrier portion in a retracted position away from the grinding wheel.
Figure 6:
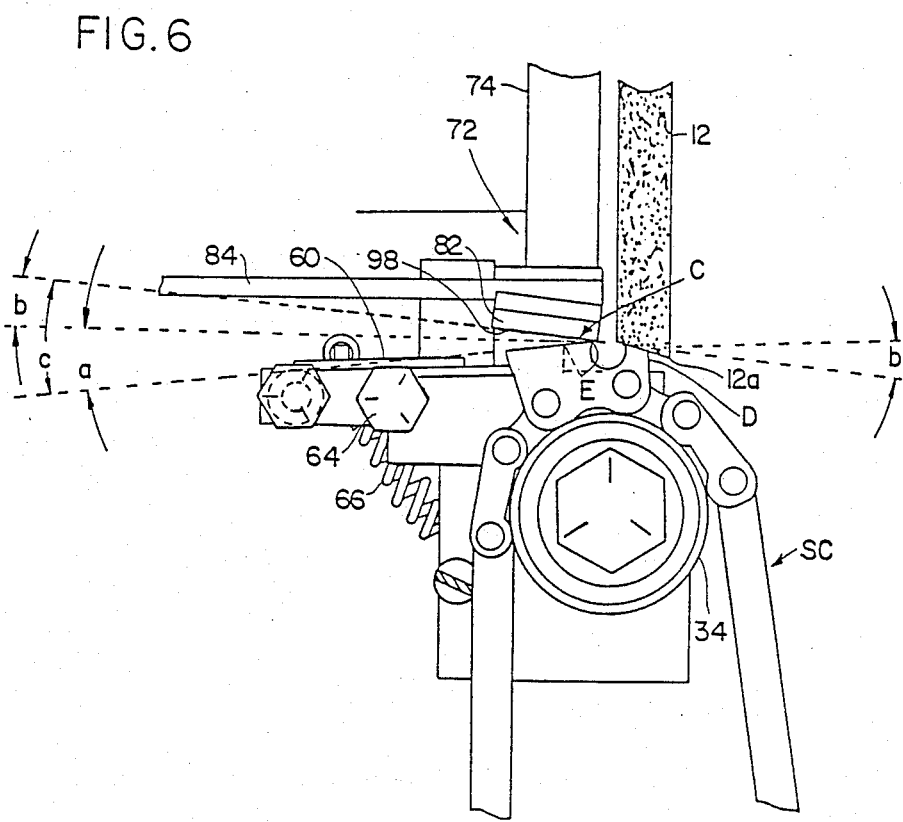
FIG. 6 is a view similar to FIG. 4 but with the saw chain carrier shown in its grinding position.
Figure 10:
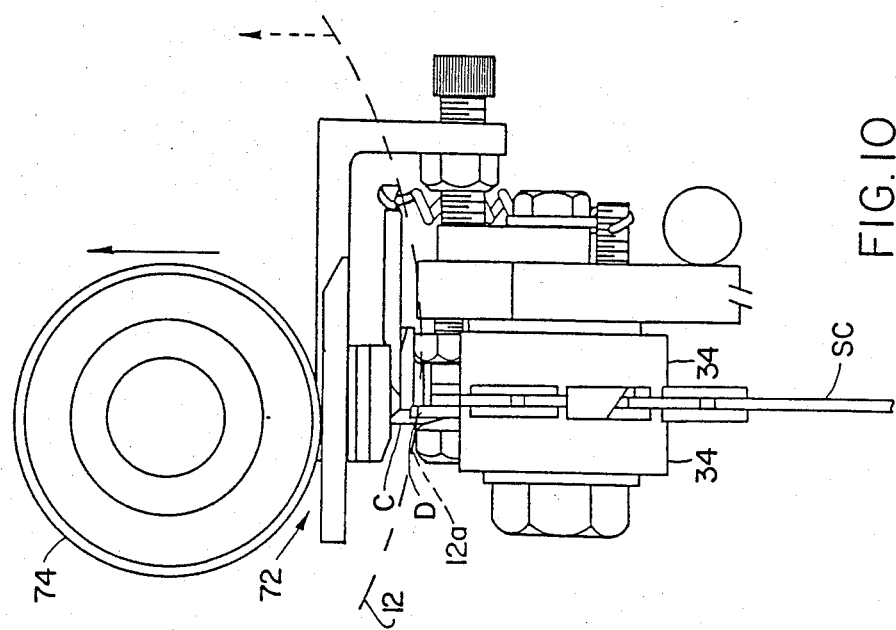
FIG. 10 is a view similar to FIGS. 7-9 but showing the carrier in its grinding position.

As shown best in FIGS. 4–6, the saw chain carrier means also includes a saw chain stop means 58 for properly positioning a saw chain cutter link C on the support rollers 34 so that when the carrier arm is pivoted toward the grinding wheel, depth gauge D will come into grinding engagement with the lowermost grinding surface 12a of the wheel. Stop means 58 includes a stop member 60 for engaging the rear edge of a cuttter link C. Stop member 60 is mounted at its rear end for pivoting movement at 62 between a raised position shown in broken lines and a lower operative position shown in full lines in FIG. 5. The lowermost position of stop member 60 is determined by an abutment member 64. A tension spring 66 connected at one end 67 to an intermediate portion of stop member 60 and at its other end to carrier plate 38 biases stop member 60 in its lower operative position.

Stop member 60 is forced to a raised position when another cutter link (not shown) is advanced into grinding position on support rolls 34 after depth gauge D of the cutter link C in FIG. 5 has been ground to its proper clearance. As the next cutter link C is advanced to its grinding position in FIG. 5, it will force stop member 60 upwardly until the advancing cutter link clears the stop member, after which the stop member drops back to its lower limit position. Thereafter, the advanced cutter link is backed against the free end of the stop member 60 to determine its grinding position.

The carrier means also includes a handle 70 operatively atached to the carrier arm for swinging the arm about its pivot axis 46. The handle is thus used to swing the saw chain support and its supported saw chain with a cutter link in grinding position toward and away from grinding wheel 12. In this way, the depth gauge D is moved into grinding engagement with the lower grinding surface 12a of the wheel.

Although a manually operated depth gauge grinder is shown, it should be understood that the grinder as described can also be automated if desired. When automated, the grinder would automatically advance a cutter link C to its grinding position on support rollers 34, then automatically swing the carrier arm toward and away from grinding wheel to grind a depth gauge to its proper clearance, and then advance the next cutter link into grinding position. A hydraulic automatic grinder operating mechanism of the type shown, for example, in my prior U.S. Pat. No. 4,416,169, can be adapted for this purpose.

Indexing Means

Regardless of whether the grinding machine is operated manually or automatically as described, it is provided with indexing means shown generally at 72 in FIGS. 1–4 and in greater detail in FIGS. 6–10. The indexing means operates to position the grinding surface 12a at a proper level, referenced to the top cutting edge of each cutter tooth T, to grind a desired clearance on the depth gauge D for that tooth. Operation of the indexing means is initiated by movement of the carrier toward the grinding wheel with a cutter link C in grinding position on the carrier.

Before describing the indexing means further, it may be helpful first to describe the anatomy of a saw chain and particularly its cutter links. Referring to FIGS. 5 and 6, a saw chain SC is mounted on a chain saw (not shown) as an endless loop and is driven on such saw by a drive sprocket connected directly or indirectly to the drive shaft of a motor. The chain itself travels about the peripheral edge, or rail, of a saw bar. The rail has a longitudinal slot to receive the tang of a center drive link of the chain. Such center drive link and particularly its tang W is shown in FIG. 1. In addition to each center drive link, the chain is made up of a series of left and right-hand side links which slide along the edge surface of the saw bar as the drive link travels in its slot. The side links are pivotally interconnected with the center drive links by rivets R. Some of the side links are cutter links C while others of the side links are so-called tie straps TS. Typically, all right-hand cutter links of a saw chain are of identical configuration as are all left-hand cutter links, and the left and right-hand cutter links are mirror images of one another.

Each cutter link, still referring to FIG. 5, includes a depth gauge D at its forward end as determined by the direction of travel of the chain on the saw bar, and a cutter tooth T rearward of the depth gauge and separated therefrom by a gullet G. Cutter tooth T, as viewed from the front, is generally L-shaped (see FIG. 12) with a top cutting edge E extending laterally of the chain and intersecting a side cutting edge at a cutting corner. The function of the depth gauge D is to determine the depth of cut of the top cutting edge E as the cutter link travels through the wood along the bottom of the kerf formed by the cutting action of the chain. For the cutter tooth to have any cutting action, the top of its depth gauge D must be lower than its cutting edge E. The vertical distance between the top cutting edge E and the top of depth gauge D is referred to herein as depth gauge clearance. This clearance for a new cutter link is typically 25 to 30/1,000 of an inch. For a worn cutter link whose tooth is much shorter because of repeated sharpenings, this clearance should be increased to up to 40/1,000 of an inch, for a reason to be explained hereinafter.

It will be noted from FIGS. 5 and 6 that the top surface of the cutter tooth T slopes downwardly and rearwardly from its top cutting edge E at an angle a to the horizontal, or more accurately to the plane defined by the bottom edge of the cutter tooth C. This angle a, referred to herein as the back slope or clearance angle, shown in FIG. 6, provides a clearance rearwardly of the cutting edge E as it moves through the wood, thereby enabling it to cut. Because of back slope angle a, not only will the cutter tooth T become shorter through repeated sharpenings, but the cutting edge E will also become lower on the cutter link. Thus, as the cutter tooth becomes shorter, the depth gauge D must be lowered to at least maintain a desired clearance. Hence, the need for a depth gauge grinding machine.

Most saw chain sharpening experts agree that the actual measured depth gauge clearance should be increased as the cutter tooth becomes shorter because of the tendency of the forward portion of the tooth, including the depth gauge, to ride higher than the rear portion of the tooth as it is pulled about the saw bar and through the wood by the chain saw. This is caused by two factors, one being the tendency of the forward rivet connecting the cutter link to the drive link to lift the forward end of the cutter link as it is pulled. The second is the tendency of the rear portion of the bottom edge of the cutter link to wear faster than the front portion because of the pressure put on the rear portion by the cutting edge while cutting.

The higher riding forward end of the cutter link has no appreciable effect on depth gauge clearance when the cutter link is new because the depth gauge D and the top cutting edge E are fairly close together and any such tendency affects both elements to about the same extent. However, as the top cutting edge recedes rearwardly on the cutter link through repeated sharpenings, the top cutting edge approaches the rear portion of the chain and its distance from the depth gauge increases. As a result, such cutting edge becomes increasingly affected by any tendency of the forward depth gauge portion of the link to ride higher than the rear portion of the same link. In effect, therefore, the actual depth gauge clearance as the chain cuts is substantially less than measured clearance in well-used saw chains having short teeth. Accordingly, measured depth gauge clearance should be increased as the cutter tooth becomes shorter to compensate for the effective reduction in clearance during operation as the cutter link wears and its tooth becomes shorter.

Now, returning to a more detailed description of the indexing means, such term as used herein refers to the means or elements of the saw chain grinder which operate to measure or gauge the desired clearance between the top of the depth gauge D and the top cutting edge E of the same cutter link and set the grinding surface 12a at a level relative to the top of the depth gauge D that will produce the measured clearance. In the illustrated grinder, indexing means 72 includes the top cutting edge E of a cutter link positioned for grinding on the chain support roll 34, and indexing roller means 74 positioned along the path of travel of the support rolls 34 toward and away from the grinding wheel. The indexing means also includes shield means 76 also positioned along such path of travel and adapted to move with the carrier means toward the grinding wheel for interaction with the indexing roller 74.

Referring to FIG. 4, indexing roller 74 is a ball bearing having its stationary center portion attached to a mounting block 78 which in turn is secured to an inverted L shaped support bracket 80. The lower end of support bracket 80 includes a forward extension 85 secured to the same pivot shaft 22 that mounts the grinding wheel assembly. Thus, any pivoting movement of shaft 22 induced by indexing roller 74 will cause a corresponding pivoting movement of grinding wheel 12 about horizontal pivot axis 23.

Still referring to FIG. 4, shield means 76 includes a shield plate 82 mounted at the forward end of a vertically resilient shield mounting arm 84. Arm 84 is secured at its inner end to a journal bearing 86 journaled on the same upright shaft 44 to which the carrier arm is journaled, for pivoting movement about the same upright axis 46 as the carrier arm.

Figure 3:
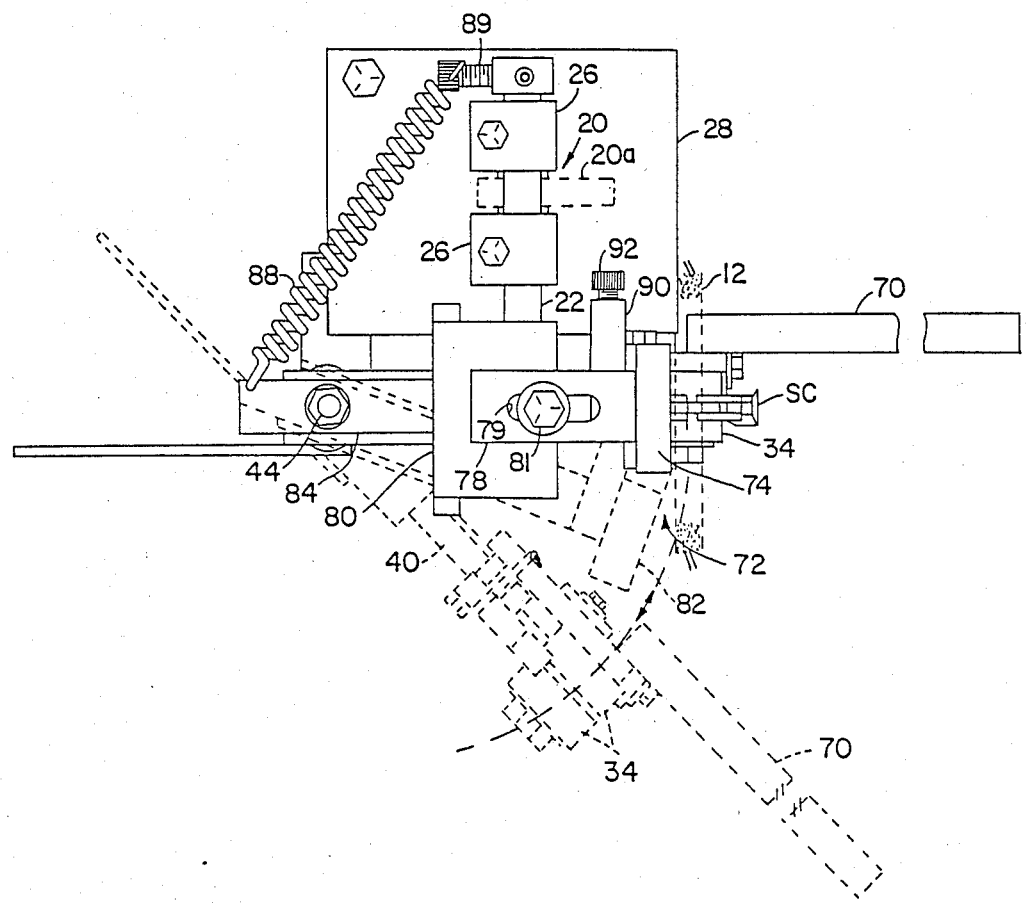
FIG. 3 is a view taken approximately along the line 3—3 of FIG. 1 showing a lower portion of the machine in plan as view from above.

As shown In FIG. 3, there is a slot 79 through which a bolt 81 extends to connect block 78 to support bracket 80. The slot thus provides for longitudinal adjustment of the effective length of the block to adjust the position of indexing roller 74 along and relative to the path of travel of support roll 34. As will be apparent from FIGS. 4 and 6, indexing roller 74 must be adjusted to contact the top of shield plate 82 when the depth gauge D of a cutter link is aligned beneath grinding wheel 12. At such time, shield plate 82 overlies the top cutting edge E of cutter link C and therefore indexing roller 74 should also overlie such cutting edge.

Indexing roller 74 also includes a height adjustment, best shown in FIG. 4. The height adjustment comprises a pair of slots 81 in the upright portion of support bracket 80 and screws 83 extending through such slots to join the upright portion of support bracket 80 to forward extension 85. By adjusting the positions of screws 83 in slots 81, the height of indexing roller 74 will be adjusted relative to the height of shield plate 82, the importance of which will soon be apparent.

As previously noted, shield mounting arm 84 is capable of pivoting about the same upright axis 44 as carrier arm 40. As shown best in FIG. 3 but also in FIG. 1, a tension spring 88 connected to the rear end of shield arm 84 and anchored by a screw 89 to the end cap of horizontal pivot shaft 22 biases arm 84 and this shield plate 82 to a retracted position away from the grinding wheel 12 and out from under indexing roller 74. This normal retracted position of the shield plate is illustrated in FIG. 7.

Referring to FIGS. 3 and 7, shield mounting arm 84 carries a laterally cantilevered pickup arm 90 which extends toward the grinding wheel and includes a downturned portion 91 mounting an abutment screw 92 which extends toward carrier arm 40. Thus, as the carrier arm swings toward the grinding wheel, shown sequentially in FIGS. 7 and 8, an abutment surface 94 on carrier support plate 38 engages screw 92, whereby continued movement of the carrier arm toward the grinding wheel carries the shield means with it, moving shield plate 82 beneath indexing roller 74. Shield plate 82 includes a laterally elongated plate portion 96 having a ramp 97 at its end nearest indexing roller 74.

Figure 9:
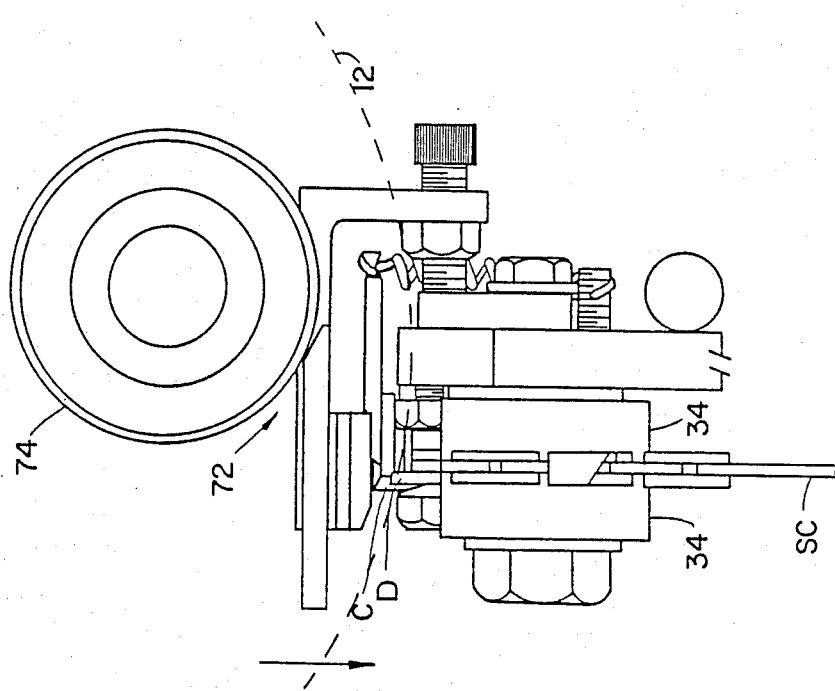
FIG. 9 is a view similar to FIGS. 7 and 8 but showing the saw chain carrier just before reaching its grinding position an at the start of the indexing operation.

As the carrier arm swings further toward the grinding wheel, picking up the shield arm with it to move it toward the wheel also, ramp 97 of shield plate portion 96 engages indexing roller 74 as shown in FIG. 9. The roller forces shield plate 82 downwardly until its bottom surface 98 engages the top of cutter tooth T because of the resilience of the shield mounting arm 84. However, as will be evident from comparing FIGS. 9 and 10, the total thickness of shield plate 82 is greater than the distance from the lowermost surface of indexing roller 74 to the top cutting edge E of cutter link C. Therefore, continued movement of carrier arm 40 toward the grinding wheel to the position shown in FIG. 10 after the shield plate has contacted the top of cutter tooth C, causes ramp 97 to force indexing roller 74 upwardly about its horizontal pivot axis 23. Because pivot shaft 22 mounts both indexing roller 74 and the grinding wheel assembly, upward movement of indexing roller 74 causes a corresponding upward movement of grinding wheel 12. The vertical position of indexing roller 74 is adjusted so that the distance travelled by roller 74 during its upward movement positions grinding surface 12a at a level below the top of cutting edge E corresponding to the desired depth gauge clearance. As a result, depth gauge D will be ground to produce that clearance.

From the foregoing description of the functioning of the indexing means, it will be apparent that shield plate 82 protects the top cutting edge E of the cutter link C from direct engagement with the indexing roller 74.

The absence of any rubbing or rolling contact between the shield plate and cutting edge prevents dulling of such edge. In FIGS. 7–10, the grinding wheel is represented by imaginary line 12 with the grinding surface 12a being at the lowest point of such line.

After the depth gauge is lowered by the grinding wheel, the carrier arm is retracted. When this occurs, shield arm return spring 88 returns the shield plate with the carrier until the plate reaches its fully retracted position shown in FIG. 7. It will be apparent from the foregoing that the weight of indexing roller 74 and the grinding wheel assembly is greater than the resistance of the shield mounting arm to downward bending movement when the shield plate contacts the indexing roller. This ensures that the shield plate is pushed against the top of the cutter tooth before any upward indexing movement of the indexing roller 74 occurs.

Automatic-Clearance Compensation Feature for Cutter Tooth Wear

FIG. 6 illustrates an important feature of the invention which provides for an automatic increase in depth gauge clearance as the cutter tooth T becomes shorter. The desirability of this feature has been previously noted. It will be evident from FIG. 6 that the bottom surface 98 of shield plate 82 is inclined in a direction rearwardly from the cutting edge E of cutter tooth T at an angle b measured from the horizontal in FIG. 6. This shield plate angle b plus the back slope angle a of the top of the cutter tooth produces a compensation angle c which is greater than the back slope angle a. Therefore, as cutter tooth T becomes shorter and cutting edge E lower with repeated sharpenings, illustrated by the broken line E', bottom surface 98 of the shield plate must move downward a greater distance before contacting the cutting edge than it normally would if such surface were horizontal. This means that after such contact, indexing roller 74 and grinding wheel 12 will move upward a lesser distance than they normally would if bottom surface 98 were horizontal. As a result, grinding surface 12a is positioned lower relative to cutting edge E' than it is positioned relative to a newer cutting edge E', producing a greater clearance with respect to edge E'. Thus, the sloping surface 98 produces a progressively increasing clearance as the tooth T becomes shorter. It will also be apparent that if the bottom surface 98 were maintained horizontal, or parallel to the bottom edge of cutter link C, depth gauge clearance would not increase as tooth T becomes shorter but instead would be maintained constant.

Figure 11:
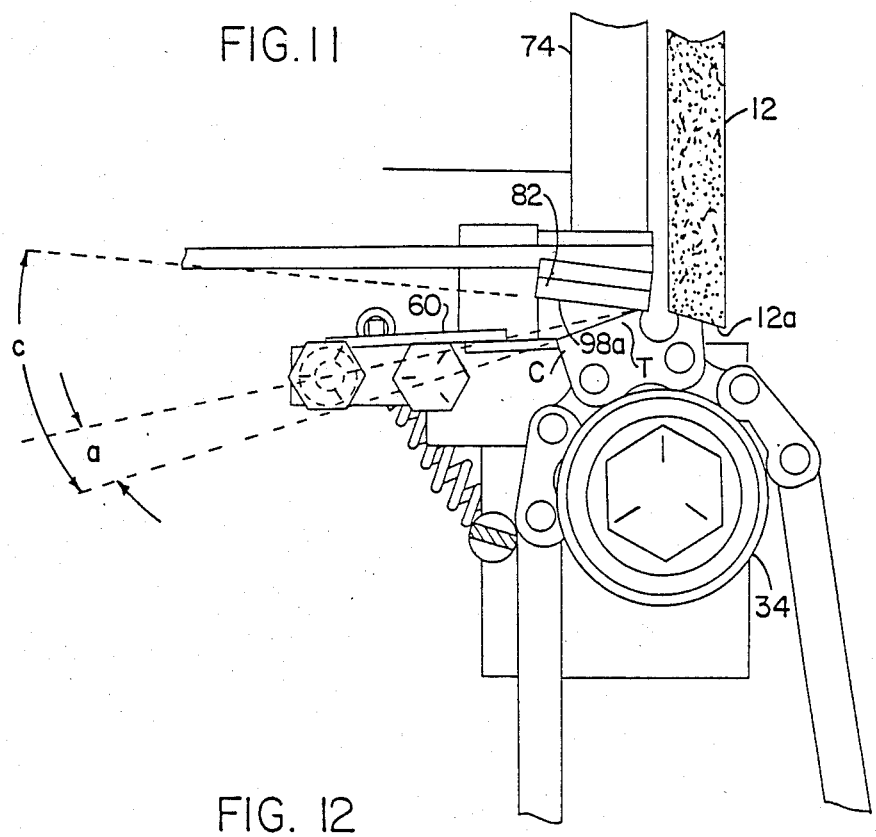
FIG. 11 is a view similar to FIG. 6 but showing a modified means for automatically increasing depth gauge clearance as the length of the cutter tooth decreases.

FIG. 11 illustrates an alternative means for achieving the same result achieved by inclined bottom surface 98 of shield plate 82; that is, another means for automatically increasing depth gauge clearance as the tooth T of cutter link C becomes shorter. In FIG. 11, bottom surface 98a of the shield plate 82 is maintained in a horizontal position, but tooth stop 60 is adjusted so that cutter link C is in its grinding position when on an "uphill" surface of chain support rollers 34 rather than when disposed horizontally at the top of such roller. In its position shown in FIG. 11, cutter tooth C is angularly disposed with respect to shield plate bottom surface 98a at compensating angle c which is greater than back slope angle a, thereby achieving the same result as described with respect to FIG. 6.

It will also be apparent from the foregoing that the automatic increase in depth gauge clearance can be achieved through a combination of a small upslope on bottom surface 98 of the shield plate and a slight angular disposition of the cutter tooth C with respect to such bottom surface. In any case, compensating angle c can be achieved either through positioning of cutter tooth C on its support rollers 34, or by inclining the bottom surface 98 of the shield plate 82, or by a combination of both. Compensating angle c in most cases should be about 4 degrees greater than clearance angle a to vary depth gauge clearance about 0.010 of an inch between a long new tooth and a short old tooth.

Automatic Clearance Compensation Between Left and Right Cutters

Figure 12:
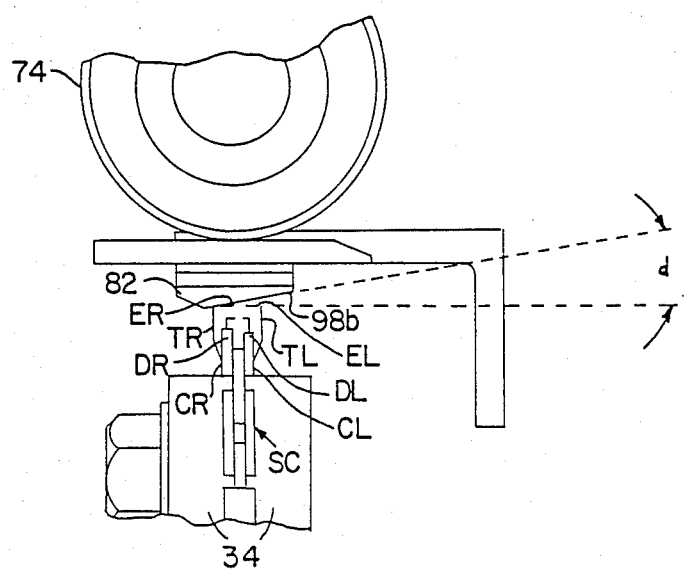
FIG. 12 is a view similar to FIG. 9 but of a modified form of the grinder including means for automatically grinding the depth gauges of the left-hand cutter links to a different clearance than the depth gauges of the right-hand cutter links.

FIG. 12 illustrates another feature of the invention which provides for an automatic differential in depth gauge clearance between the right-hand and left-hand cutter links. As previously mentioned, in some instances this is a desirable feature to prevent the saw chain from running in one direction or another. In FIG. 12, the bottom surface 98b of shield plate 82 is sloped upward from left to right laterally of saw chain SC at an angle d to the horizontal or the plane defined by the top cutting edges $E_R$ and $E_L$ of the right and left-hand teeth $T_R$ and $T_L$, respectively, of right and left-hand cutter links $C_R$ and $C_L$, respectively. As a result, when the depth gauge of a right-hand cutter link is ground, the bottom surface 98b of shield plate 82 will contact the cutting edge $E_R$ of the right-hand cutter link at a higher level than such surface will contact the cutting edge $E_L$ of the left-hand cutter link when the depth gauge of that link is being ground. Accordingly, shield plate 82 will force indexing roller 74 higher when it contacts a right-hand cutter link than it will when it contacts a left-hand cutter link. As a result, the grinding wheel 12 will contact the depth gauge $D_R$ of the right-hand cutter ink at a higher level than it will the depth gauge $D_L$ of a left-hand cutter link, thereby maintaining the depth gauges of the right-hand cutter links at less clearance than the depth gauges of the left-hand cutter links. As the saw chain cuts, this will tend to cause the left-hand cutter links $C_L$ to outcut the right-hand cutter links $C_r$, thereby tending to compensate for the tendency of the saw chain to run to the left. Of course, if a saw chain tends to run to the right while cutting, a shield plate with its bottom surface sloped in the opposite direction from that shown in FIG. 12 should be used. Also, if it is desired to maintain depth gauge clearance of the right and left-hand cutter links the same, then bottom surface 98 should be maintained parallel to the top cutting edges E of the right and left-hand cutter links.

FIG. 13 Embodiment

Figure 13:
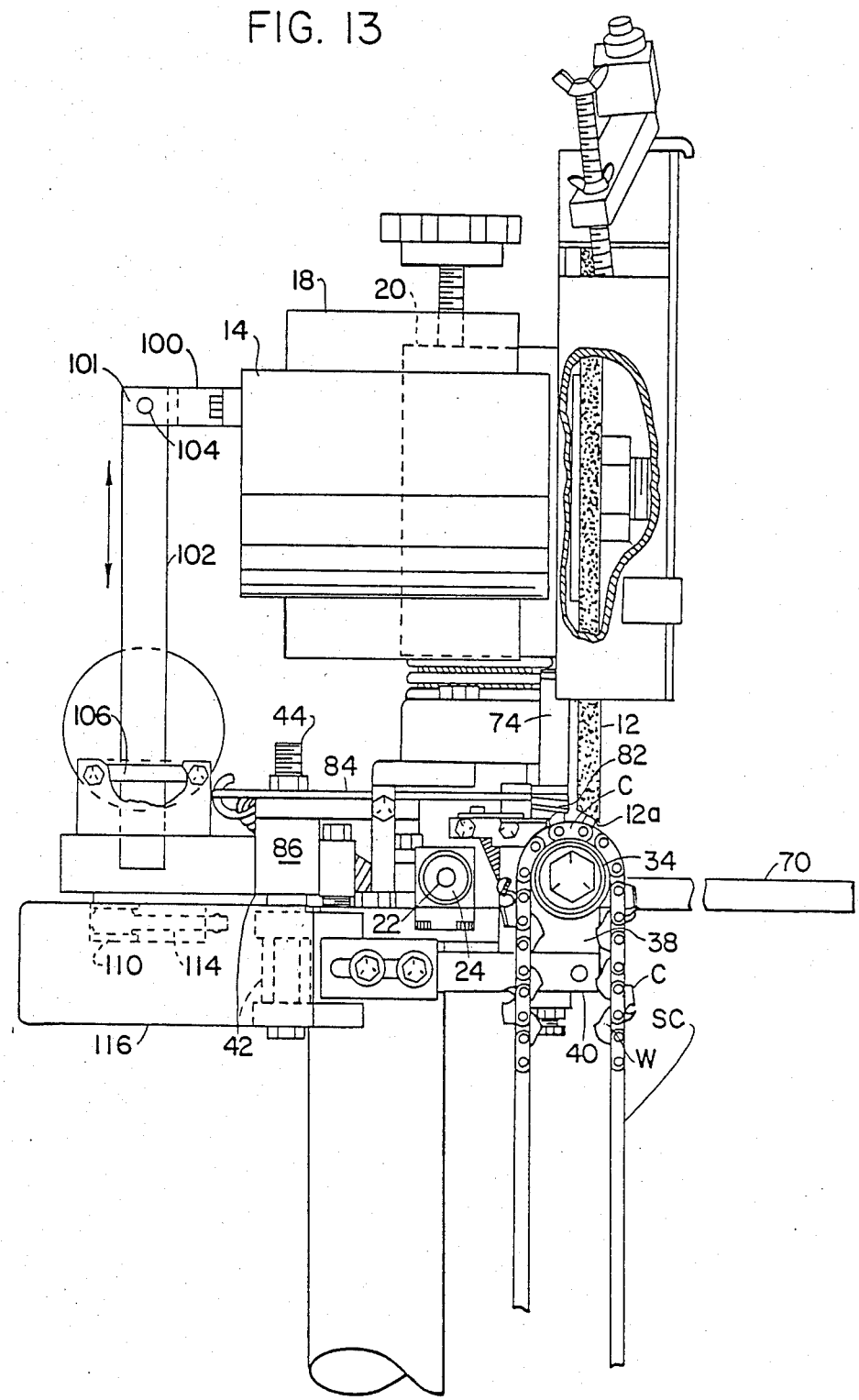
FIG. 13 is a side elevational view similar to that of FIG. 1 but showing a modified form of the grinding machine incorporating an electrical switch-actuated brake.

FIG. 13 illustrates a modification of the grinder of FIG. 1 which includes means for presetting the proper height of the grinding wheel and thus grinding surface 12a for grinding depth gauges to a desired predetermined clearance. The grinder of FIG. 13 is essentially the same grinder as that of FIG. 1 with exceptions which will be described. The reference numbers used in FIGS. 13–16 that are also used in the preceding figures refer to the same elements as found in the preceding figures.

Figure 16:
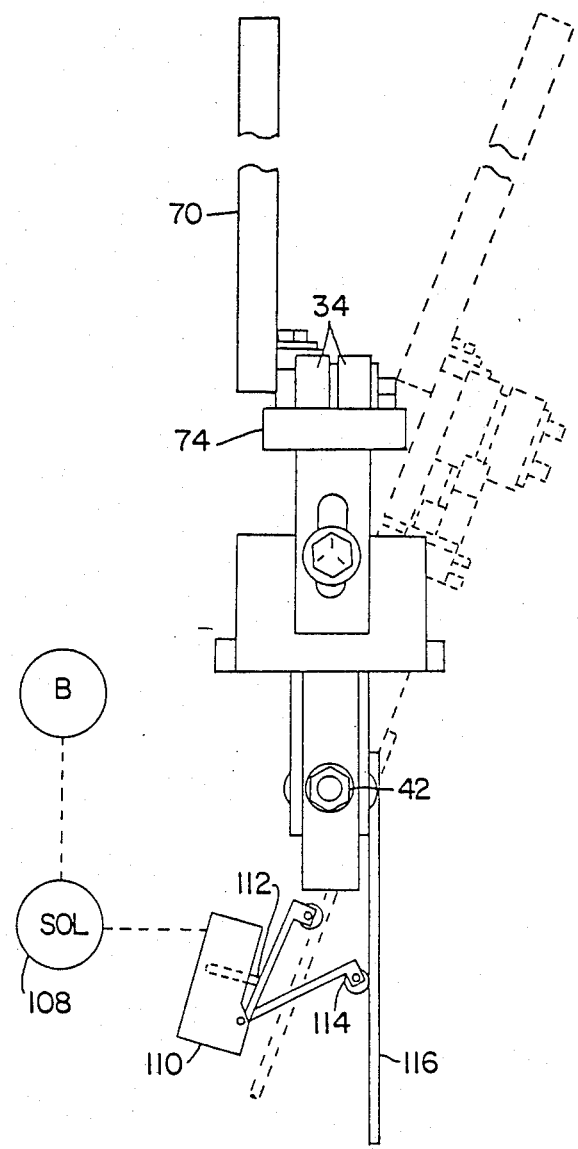
FIG. 16 is a view similar to FIG. 3 but illustrating the FIG. 13 embodiment.

Referring to FIGS. 13 and 16, an extension member 100 is attached to a rear end portion of motor casing 14 and extends rearwardly therefrom. The extension member includes a clevis portion 101 at its rear end. The upper end of a brake arm 102 extends within clevis portion 101 and is pivoted thereto at 104. Brake arm 102 extends downwardly between a set of brake shoes 106. One of the brake shoes is connected to the plunger of a solenoid 108 (FIG. 16), actuation of which forces the connected brake shoe against brake arm 102 and an opposing brake shoe to prevent vertical movement of the arm and thus prevent pivoting movement of the connected motor and grinding wheel assembly on pivot shaft 22.

Figure 14:
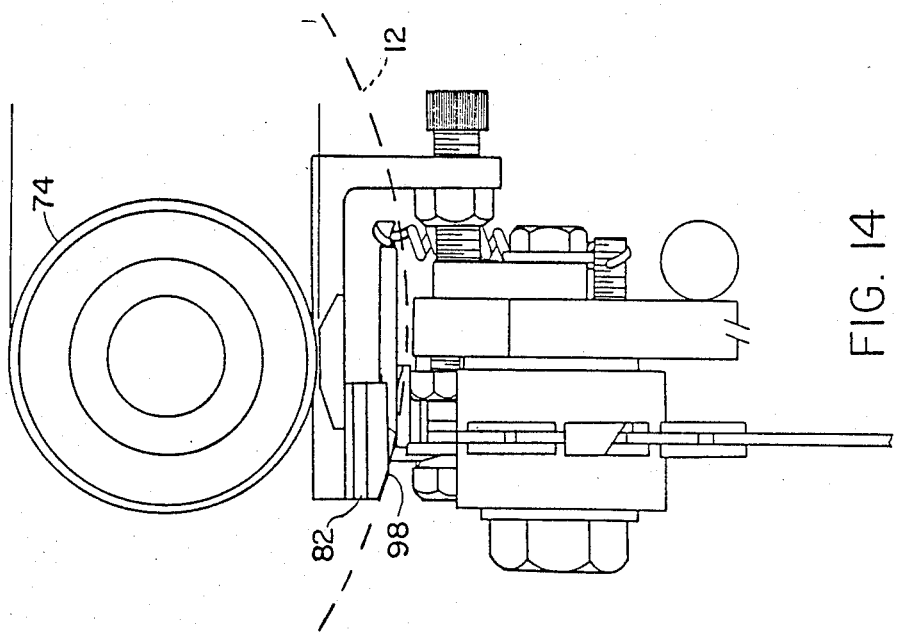

Solenoid 108 is energized by a brake switch 110 having a switch actuator 112 connected to an actuating arm 114. Arm 114 is in a position to be contacted by a rear extension 116 of carrier arm 40 rearwardly of the carrier arm pivot 42 during swinging movement of the carrier arm. More specifically, when carrier arm 40 is in its retracted position away from the grinding wheel, arm portion 116 contacts actuator arm 114 to condition switch 110 so that solenoid 108 is deenergized. However, as carrier arm 40 swings the saw chain support toward the grinding wheel to a point where shield plate 82 forces indexing roller 74 upwardly to position grinding wheel 12 in its grinding position, as shown in FIG. 14, arm extension 116 disengages actuator arm 114 to condition switch 110 for energizing solenoid 108. Solenoid 108 thus forces brake shoes 106 against the brake arm 102 to maintain the grinding wheel assembly and thus grinding wheel 12 in its elevated grinding position.

Figure 15:
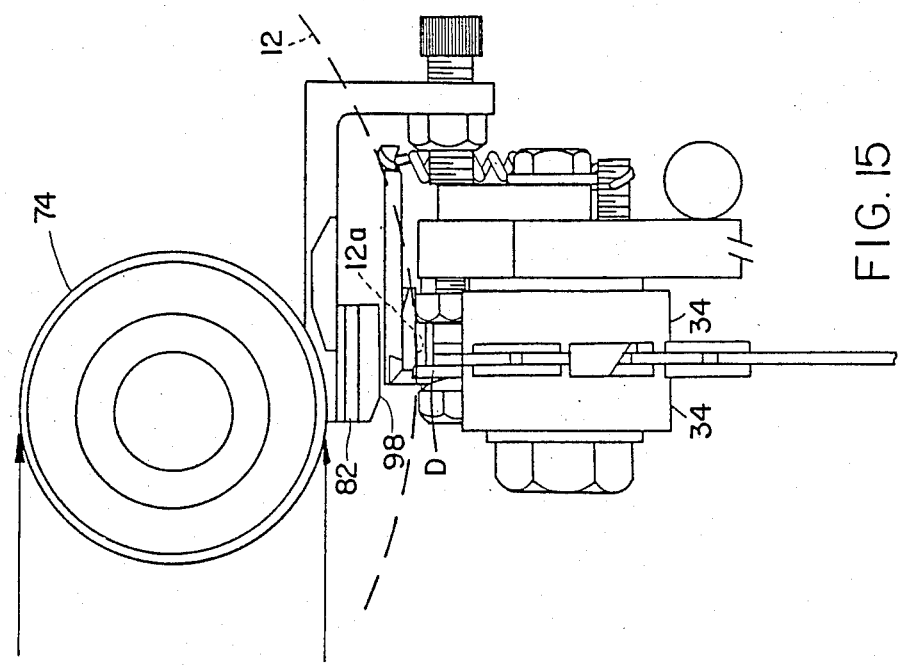
FIGS. 14 and 15 are sequential side elevational views, similar to FIGS. 7-10 but of a portion of the grinding machine of FIG. 13 illustrating operation of such modification.

Thereafter, continued movement of the carrier arm 40 and its associated shield plate 82 beyond indexing roller 74, as shown in FIG. 15, to a position where depth gauge D of the cutter link engages the grinding surface 12a, does not affect the grinding position of the grinding surface. Instead, the grinding surface is maintained by the brake shoes in its grinding position.

Thus, in the FIG. 13 embodiment, indexing roller 74 coupled with the braking means serves as a means for presetting the grinding position of grinding wheel 12 before grinding occurs rather than during grinding, as is the case with the embodiment of FIG. 1. As soon as carrier arm 40 swings the chain support rollers 34 inwardly toward the grinding surface and out from beneath indexing roller 74, the resilience of the shield arm 84 causes the shield plate 82 to rise out of contact with the cutter tooth so that there is no contact between the cutter tooth and the shield plate as grinding occurs. As a result, there is minimum frictional contact between the shield plate and the cutter tooth, such contact occurring only momentarily while the cutter tooth briefly passes beneath indexing roller 74.

When the carrier arm 40 is swung back to its retracted position, it must again pass beneath indexing roller 74. However, because the carrier arm 40 and the shield plate support arm 84 are not tied together, chain support rollers 34 and the supported cutter link can pass beneath roller 74 on the return before shield plate 82 so that shield plate 82 will not necessarily be forced down against the top of the cutter tooth of the supported cutter link during the return of the shield plate and the support rollers 34 to their respective retracted positions.

After the saw chain support rollers 34 have passed beneath indexing roller 74 in their return to their retracted positions, carrier arm extension 116 again contacts the switch actuator arm 114 to deenergize solenoid 108. This releases the brake and returns the grinding wheel to its lowered, inactive position.

From the foregoing description with reference to FIGS. 14 and 15, it will be apparent that the grinding surface 12a of grinding wheel 12 is offset to the right of the vertical centerline of indexing roller 74 as viewed in FIGS. 14 and 15. This should be contrasted with the arrangement of these elements in FIGS. 7-10 where the lowermost grinding surface 12a is aligned directly beneath the centerline of indexing roller 74. In any case, it will be clear from FIG. 15 that there is no contact with the cutter tooth while its associated depth gauge is ground. Furthermore, there is no contact between the indexing roller 74 and the shield plate 82 during such grinding operation. Thus, indexing roller 74 is only used to preset the grinding position of grinding wheel 12 and is not used to hold such grinding wheel in its grinding position, unlike the FIG. 1 embodiment.

It will be apparent from the discussion of the FIG. 13 embodiment that, if desired, the shield support arm 84 could be used to actuate the brake switch 110 rather than the rearward extension 116 of carrier arm 40.

FIG. 17 Embodiment

FIGS. 17-21 illustrate a further modification of the grinder and more particularly include indexing means which control the grinding of depth gauges for the desired depth gauge clearance but such indexing means has an improved arrangement such that there is no contact between the top cutting edge of the tooth and the indexing means. This embodiment is similar to FIG. 1 in employing a grinding wheel 12 and drive motor 14 pivotally mounted as a unit on a common pivot shaft 22 supported on a stationary frame 28, the grinding surface of the wheel 12 being designated by the numeral 12a. The grinding wheel and motor are normally held in down position by spring means as in FIG. 1 and have limited pivotal movement in a lifting position away from the grinding position for accomplishing desired grinding of depth gauge clearance. Frame 28 has a horizontal platform portion 29 secured to a stationary support column 30.

Also supported on the frame 28 is a saw chain carrier 32 having support rollers 34 as in FIG. 1 and a carrier plate 38 extending upwardly from a carrier arm 40 pivoted on an upright shaft 44 on the frame 28 for pivoting movement on a generally upright axis. Carrier arm 40 has length adjustment means 50, 52 as in FIG. 1 and also has vertical adjustment means, not shown. Further as in FIG. 1, the saw chain carrier means 32 includes a pivoted saw chain stop 58 for properly positioning a saw chain cutter link C, FIG. 20 on the support rollers 34. This stop has spring pressed pivoted movement for holding it in abutting position with a saw chain tooth and for allowing other teeth to move forward to a grinding position. A handle 70 projects from the carrier arm for swinging the arm about its pivot axis toward and away from the grinding wheel 12. This embodiment as in FIG. 1 can either be manually operated or automated for advancing a cutter link to its grinding position on the support rollers 34 and swinging the carrier toward and away from the grinding wheel.

This embodiment also employs indexing means 72 to position the grinding surface 12a of the grinding wheel at a proper level with reference to the top cutting edge of each cutter tooth T for grinding the desired depth gauge clearance for that tooth. As in FIG. 1 the indexing roller 74 is supported on a bracket 80 secured to the same pivot shaft 22 to which the grinding wheel assembly is secured whereby roller 74 and the grinding wheel pivot as a unit. Also as in FIG. 1, the arm 80 has longitudinal adjustment for selective positioning relative to the path of travel of support roll 34.

The indexing means of the present embodiment controls the grinding depth of the grinding wheel on the depth gauges without providing any contact or compressive force between main cutting portions E of the cutting teeth and the indexing roller 74, thus eliminating any possible damage to the tooth and particularly to the top cutting edge. Indexing roller 74 includes height adjustment as in FIG. 1.

Figure 17:
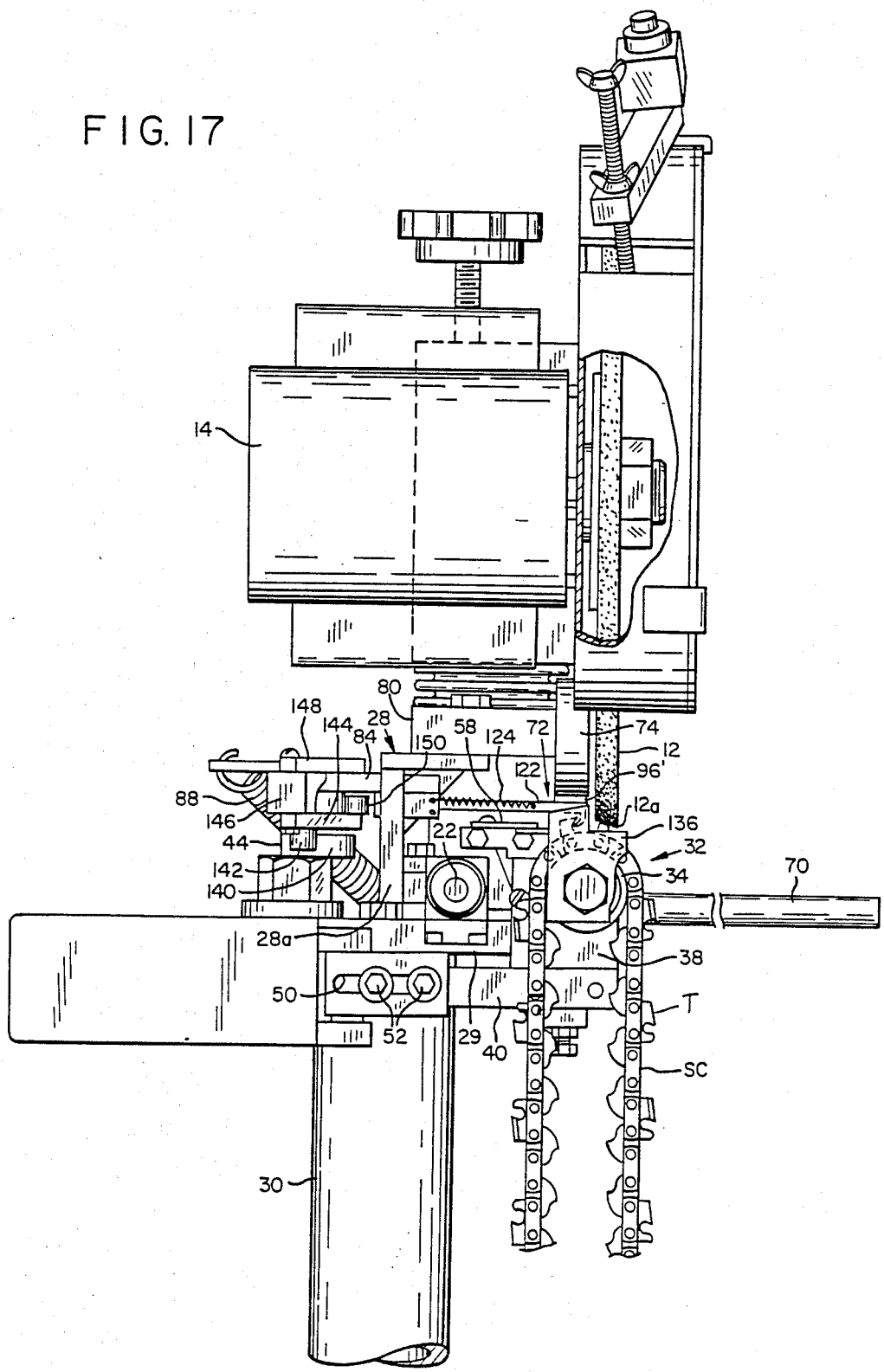
FIG. 17 is a side elevational view similar to FIG. 1 showing another modification of the invention.

In the embodiment of FIGS. 17–21, the indexing means includes shield means 76', best seen in FIGS. 20 and 21, having a body portion 120 on the forward end of a horizontal stem 122 having slidable support in a mounting arm 84' journaled on the upright shaft 44, FIG. 17, for pivoting movement about the same upright axis as the carrier arm 32. A tension spring 124 connected between the arm 84' and the stem urges the latter to a rearward or retracted position. A tension spring 88 connected to the rear end of arm 84' biases this arm to a retracted position away from the grinding wheel 12 and out from under indexing roller 74. This spring will automatically retract the arm 84' to an outward limit position against vertical portion 28a of frame 28 when the saw chain carrier 32 is swung outwardly. The carrier frame 32 continues to pivot outwardly past the stop position of arm 84' against the frame portion 28a for the purpose of loading and unloading the chain. Conversely, as the carrier frame 38 moves inwardly toward the grinding wheel, it abuts against arm 84' similar to the arrangement in FIG. 1 and carries the shield mechanism with it. As will now be apparent, this inward travel of the carrier arm 38 causes shielding of the main cutting portion of the teeth from the indexing means and also the grinding clearance of the depth gauge is preselected according to the length of the tooth.

More particularly, the body portion 120 of the shield means 76' is widened whereby to extend fully across the width of both right and left hand cutter teeth of a saw chain. It doubles back at the forward end in a depending hook 126 arranged to engage the side cutting edge of the teeth. The rearwardly turned edge 128 of this hook is spaced downwardly from the body portion of the shield means so as to engage the cutting edge at the side and at a point considerably below the top. It has been found that most of the cutting is accomplished by the top edge of the tooth and by only a short distance down the side edge of the tooth. The hook edge 128 is preselected to engage the side edge below this main cutting portion and thus this engagement with the tooth has no appreciable dulling effect. Body portion 120 has a laterally elongated plate or upward extension 96' thereon arranged for lifting engagement against the underside of indexing roller 74.

The bottom surface 130 of the body portion 120 of the shield means 76' is angled downwardly from front to rear and this surface is arranged for abutment on ramps 132 and 134 secured on supports 136 in upright relation on carrier arm 38. The surfaces of ramps 132 and 134 have the same slope and are in the same plane. Ramps 132 and 134 are angled downwardly from front to rear similar to the bottom surface 130 of body portion 120. The disposition of surface 130 and the top of the ramps is such that when in engagement they support the body portion 120 in a small clearance above the tooth so that there is no engagement with the tooth other than by the hook edge 128 down on the side of the teeth. Due to the inclination of surface 130 and the ramps 132 and 134, it will be apparent that the farther to the rear that the surface 130 engages the ramps, namely, to the left in FIG. 20, the lower the body portion 120 will be for a purpose to be more fully explained hereinafter.

Forward or advancing movement of the body portion 120 and stem 122 is accomplished by a cam assembly now to be described. Rearward movement is accomplished by the spring 124. This forward and rearward movement are to position the body portion 120 in a clearance position for advancing the chain and for selectively positioning the grinding wheel in a functional position for proper grinding of the depth gauge according to the length of a cutter tooth. A cam bar 140 having forward and rearward cam surfaces 140a and 140b, respectively, is secured to the chain carrier arm 38 adjacent the pivot shaft 44. This cam bar thus pivots with the arm 38. Cam bar 140 is engaged by a cam follower 142 such as a roller supported in depending relation on a horizontal arm 144 pivotally supported on a vertical post 146 secured in depending relation on a horizontal arm 148 welded or otherwise supported integrally by the arm 84'. The inner or free end of arm 144 supports a vertical axis roller 150 on the upper side thereof and in the plane of the stem 122. The stem 122 projects through its slidable guide portion of arm 84' and the roller 150 is arranged for engagement with the rear edge 122a of the latter, whereby upon relative rotation of the arm 84' and the saw chain carrier arm 38 resulting from movement of the cam follower 142 on the cam bar 140, as will be more apparent hereinafter, the roller 150 is arranged to push the stem 122 forwardly. In the opposite relative rotation of the stem 122 and carrier arm 38, the spring 124 returns the stem.

In the operation of the embodiment of FIGS. 17–21, the saw chain carrier arm is retracted by pulling outwardly on handle 70. In this outward position of the arm 38 the chain can be mounted on the support rollers 34. In outward pivoting movement of the carrier arm, the stem 122 and its mounting arm 84' will follow a part of the way under the action of spring 88. This arm will abut frame portion 28, however, at an intermediate outward position thereof, and further outward swinging movement of the carrier arm clears the chain from the stem 122 and head 120 so that the chain can be mounted or removed or advanced to the next tooth. In the outward movement of the carrier arm 38 past the stop position of the arm 84', FIG. 19, the arm 38 is disposed angularly relative to the arm 84, whereby the cam follower 142 has moved onto cam bar surface 140a. This pivots arm 144 clockwise to cause roller 150 to push stem 122 forwardly or in other words to extend the stem. Outward movement of the stem is sufficient to position the hook edge 128 of the body portion 120 forwardly of the cutting edge E of the next tooth to be positioned for grinding of the depth gauge.

With the chain advanced to dispose the next tooth on top with the stop 58 in engagement with the top of the tooth, the carrier arm 38 is swung inwardly. As its movement is initiated, the chain carrier pivots relative to the arm 84' whereby cam follower 142 moves onto cam surface 140b. This pivots arm 144 counterclockwise which moves the roller 150 rearwardly to allow retraction of the stem 122, FIG. 18. As the chain carrier pivots relative to the arm 84' the hook edge 128 backs against the side cutting edge of the tooth and holds it rearwardly against stop 58. At this time, the bottom surface 130 of the body portion 120 has moved into engagement with the ramps 132 and 134 and supports this body portion in a small clearance above the tooth. Thus, as the body portion 120 is positioned on the ramps 132 and 134, the hook 126 will have engaged the side of the cutting edge of the tooth and the stem 122 will have positioned itself longitudinally. Thereupon, further inward movement of the carrier arm drives the plate portion 96 under the indexing roller to raise the grinding wheel and to cause the latter to grind the depth gauge.

The parts are dimensioned and arranged such that the engagement of the body portion 120 with the ramps achieves the proper depth of grinding. That is, in a new tooth, for example, the length thereof is quite long and this causes the hook 126 to hold the body portion 120 high on the ramps 132 and 134 and thus lift the grinding wheel by means of engagement of the plate portion 96' with the indexing roller 76. On the other hand, when the tooth shortens from wear and sharpening, the hook body portion 120 can retract farther down the ramp and thus its lowered position lowers the grinding wheel. FIG. 20 shows in dotted lines the position of the hook on a shortened tooth. The position of abutment of the surface 130 and the ramps 132 and 134 thus automatically lowers the grinding wheel as the tooth shortens and furthermore these surfaces are angled to produce the compensation angle similar to the angle c in FIG. 6 to progressively increase the clearance as the tooth T becomes shorter.

As stated hereinbefore, the ramps 132 and 134 when engaged by the body portion 120 provide clearance of the latter relative to the top edge of the tooth and the tooth does not enter into any of the lifting force whatsoever for the grinding wheel. The only contact with the tooth is a light contact on the side edge by the hook 126 and even at that this is below the main cutting portion of the side cutting edge since as stated hereinbefore the main cutting portion of the side edge is only a short portion of the edge adjacent the top. Thus, there is no material damaging or dulling contact of the tooth and none at all of the top cutting edge E. The edge 128 is of sufficient width to engage both right and left hand teeth.

FIG. 22 Embodiment

FIGS. 22-25 illustrate another embodiment of the invention which includes indexing means controlling the grinding of depth gauges for the desired clearance. Such embodiment is similar to the embodiment of FIG. 17 to the extent that an indexing hook is used to engage a side cutting edge of a cutter tooth for positioning the plane of grinding of the grinding wheel. Furthermore, it is similar to FIG. 17 in that no lifting contact with the tooth exists for lifting the grinding wheel assembly. The grinding wheel is designated by the numeral 12 and the drive motor is designated by the numeral 14. These members are pivotally secured as a unit to a common pivot shaft 22 having journaled support on a stationary frame 28.

In this embodiment the saw chain carrier 32' similarly utilizes upper and lower chain support rollers 34. The upper support rollers 34 are mounted rotatably between a pair of upper links 160 secured together at their bottom ends by a spacer 162 having free journaled support on a laterally extending shaft 164 supported adjacent the bottom of auxiliary frame members 166 depending integrally from frame 28. A handle 168 is secured integrally to the outer link 160 for operator control, and in operation this handle is used to pivot the upper portion of the chain carrier between positions shown in FIGS. 22, 24 and 25.

Figure 22:
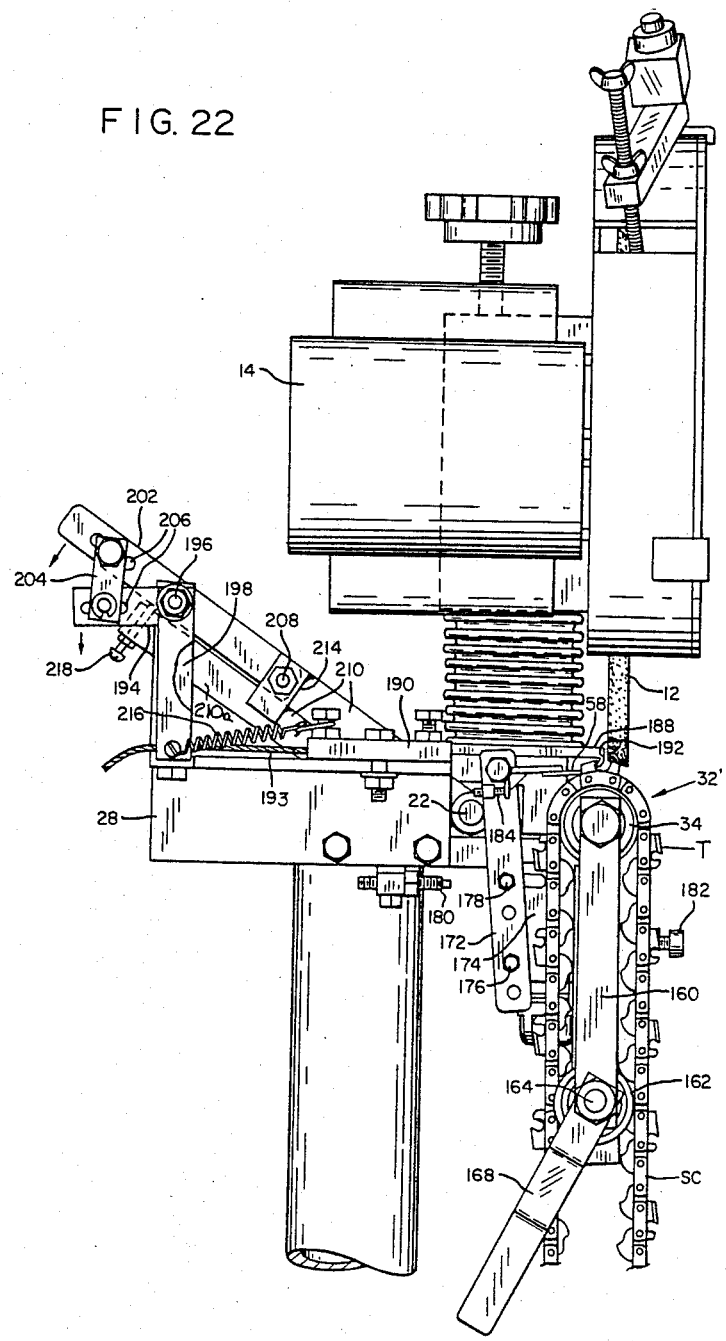
FIG. 22 is a side elevational view similar to FIG. 1 and showing a further modification of the invention.
Figure 23:
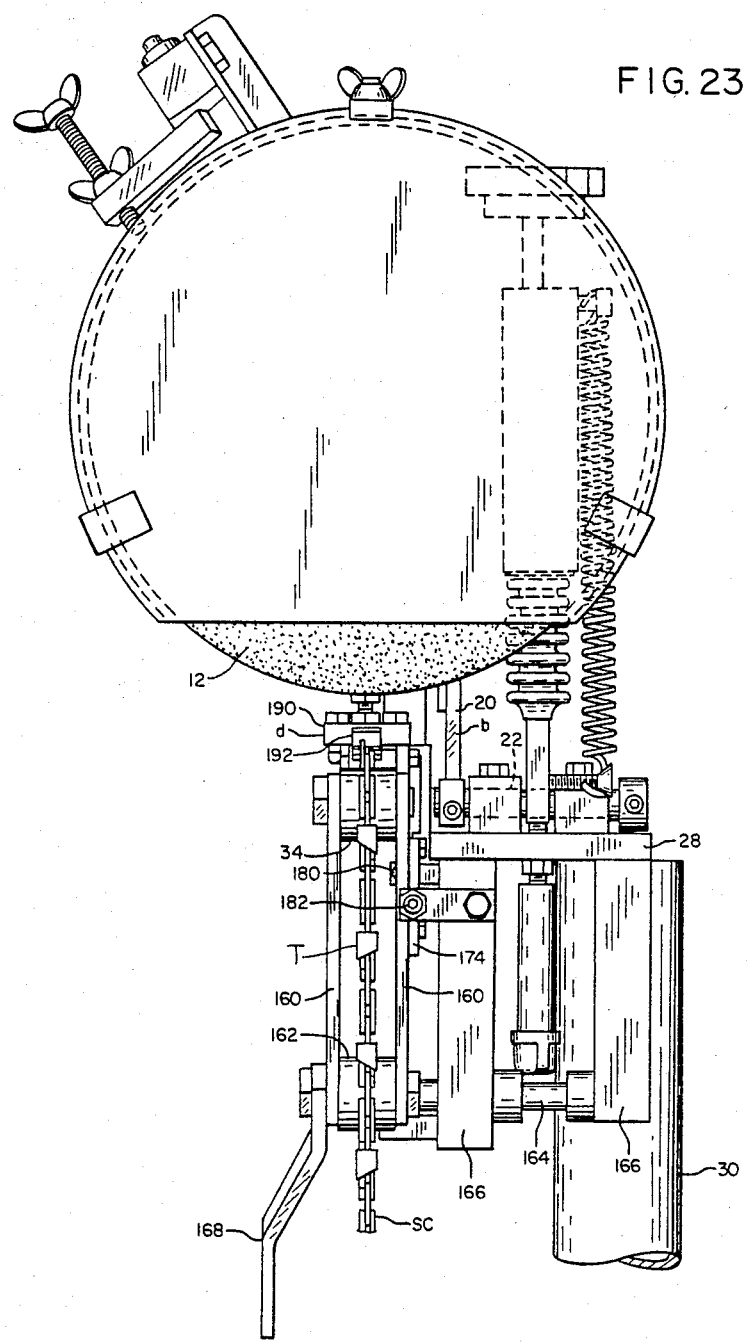
FIG. 23 is a front elevational view of the embodiment of FIG. 22.
Figure 24:
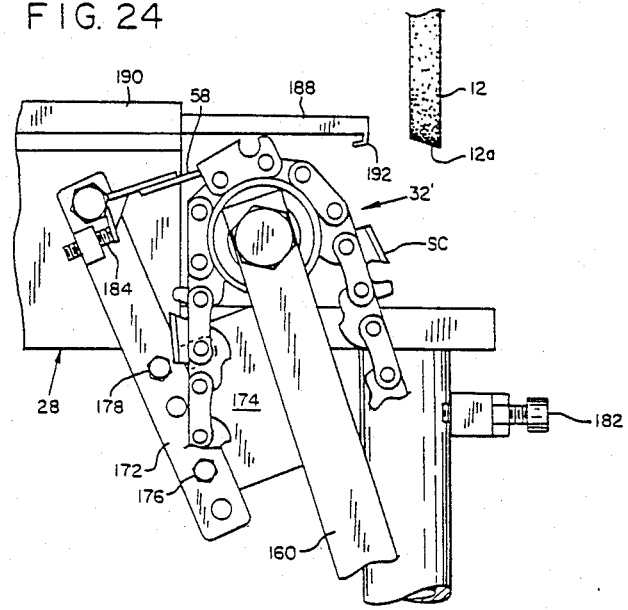
FIG. 24 is an enlarged elevational view of the saw chain carrier portion in a retracted position away from the grinding wheel.

As in FIG. 1, the saw chain carrier includes a spring pressed saw chain stop 58 which allows the chain to be advanced but which abuts against the back of the tooth to hold the tooth in a set position for grinding. In this embodiment, the stop 58 is supported adjacent the top of an arm 172 mounted on an extension 174 integral with the inner link 160. Arm 172 has means for adjusting longitudinal positioning of stop 58 and for this purpose it has pivotal support 176 adjacent the bottom thereof on extension 174 and secured in pivoted adjusted position by a slot and locking screw means 178 above the pivot. Adjustable stop means 180 are secured on the frame 28 in alignment with the arm 172 to limit pivot movement of the upper portion of the saw chain carrier in the one direction. Also, adjustable stop means 182 are mounted on one of the members 166 and aligned with a link 160 to limit pivot movement of the upper portion of the saw chain carrier in the other direction. As seen in FIG. 22, adjustment means 184 on the arm 172 are provided for adjustably positioning the stop 58 for proper engagement by cutter teeth.

In this embodiment, the indexing means includes an elongated slide plate 188 slidably supported in a guide 190 secured to the frame 28. Plate 188 has a hook end 192 arranged to engage a side edge of a cutter tooth similar to the hook in the FIG. 17 embodiment, namely, the hook does not engage the top cutting edge but engages only a lower portion of the side cutting edge. Slide plate 188 is connected by means of a cable 193 to the lower end of an upstanding right angle lever 194 pivotally supported at 196 on an upright arm 198 secured integrally to the frame 28. Lever 194 is connected to the outer or upper end of a link 202 by means of an upstanding link 204, the connections of the link 204 to lever 194 and link 202 being pivotal and adjustable by adjustment means 206 for proper setting. The lower end of link 202 has a pivot support 208 on a lever 210 secured at its lower end to shaft 22 for rotation therewith. An upwardly extending portion 210a of lever 210 projects up under the link 202. The lever 210 comprises depending tabs 214 welded or otherwise securing these portions together, and these tabs provide the journaled support for the pivot 208 of the link 202. Link 202 rests on an adjusting screw 218 which is mounted in the upper end of lever segment 210a and which projects through such lever for engagement with the link 202. Adjusting screw 218 provides fine adjustment for grinder position as will be more apparent hereinafter. Lever 194 is biased in a counterclockwise direction, FIG. 22, by a tension spring 216 secured between the lower end of such lever and a stationary anchor point such as the guide 190. This spring is arranged to push the slide plate 188, through the compressive strength of cable 193, outwardly relative to the guide 190.

In this embodiment, the chain carrier 32' does not swing out toward the operator but instead operates solely in the one plane. To load the chain on the support rollers 34, the handle 168 is manipulated to pivot the upper portion 160 of the chain carrier to the angled position shown in FIG. 24. In this position, the chain can readily be installed or removed or advanced past the stop 58. Also, in this angled position, the grinding wheel assembly will be in its down, gravity held position. The return pivoting movement of the grinding wheel assembly toward its rest position will have pivoted the shaft 22 clockwise which likewise pivots the levers 194 and 210 clockwise to retract the slide plate 188 and its hook 192 in a direction horizontally away from the grinding wheel. The horizontal plane of the hook 192 is slightly below the top of the saw chain, but when the upper portion 160 of the chain carrier is tilted to the FIG. 24 position, the chain is below and clear of the hook so that the chain can be installed, removed or advanced.

Figure 25:
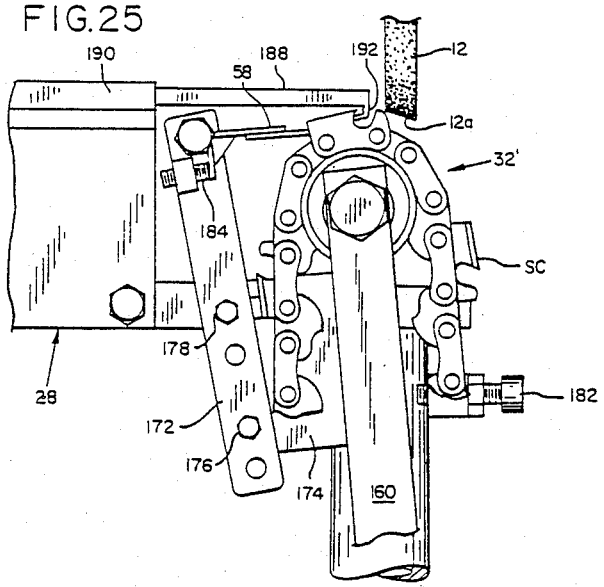
FIG. 25 is a view similar to FIG. 24 but showing the saw chain carrier portion in a position just before grinding is initiated.

As the upper portion 160 of the chain carrier pivots toward the grinding wheel, FIG. 25, the hook engages and drops over the advancing depth gauge and catches the front side edge of the tooth. As stated hereinbefore, the hook engages a lower portion of the front side edge of the tooth and does not materially affect this cutting edge. The parts are arranged such that the hook engages the tooth prior to movement of the depth gauge into engagement with the grinding wheel. FIG. 25 shows the parts approaching the grinding wheel, and just before the depth gauge gets to the grinding wheel, the travel of the tooth on the pivoting portion 160 pulls the hook and slide plate 188 to the right. This in turn causes counterclockwise pivoting of the levers 194, link 202, lever 210, and shaft 22 to raise the grinding wheel to the proper grinding position. FIG. 22 shows the grinding position of the parts. By selective positioning of the grinding wheel in its rest position and functioning of the properly adjusted levers, the necessary clearance is achieved for the depth gauge relative to the cutting edge of the tooth. In a long tooth, such as when it is relatively new, the slide plate will be pulled outwardly more than for a short tooth so as to raise the grinding wheel, but it is apparent that as the tooth wears or is ground shorter, the slide plate will be pulled outwardly a lesser distance and this raises the grinding wheel a lesser distance whereby to proportionately lower the length of the depth gauge. Screw 218 provides the fine adjustment of the levers for proper position of the grinding wheel when the chain carrier has reached grinding position. That is, by setting the screw deeper in the lever 210 or in other words providing a greater separation of the parts 210 and 202 at upper end of the part 210, the grinding wheel will be raised in a higher plane as the chain carrier reaches grinding position whereas retracting this screw will cause the grinding wheel to be disposed in a lower plane as the chain carrier reaches grinding position.

From the foregoing description of the various embodiments, it will be apparent that the carrier arm moves the saw chain cutter link to position the depth gauge of such cutter link beneath the grinding wheel and in grinding engagement with the grinding surface 12a. However, it will also be apparent to those skilled in the art that in most cases the same result could be accomplished by moving the grinding wheel assembly toward and away from the saw chain support to accomplish the same result. In either case, there is relative movement between the grinding wheel and the saw chain support along a predetermined path to position a selected cutter link so that its depth gauge grindingly engages the grinding wheel. Also, the grinding wheel and saw chain support move relative to one another in a direction normal to such path to correctly position the grinding surface 12a to grind the desired clearance on the depth gauge. Regardless of whether the required transverse and normal movements described are accomplished through actual movement of the saw chain support or actual movement of the grinding wheel, the depth gauge clearance compensation features would still be operable.

Having illustrated and described the principles of my invention by reference to a preferred embodiment and several possible modifications thereof, it should be apparent to those persons skilled in the art that the preferred embodiment may be modified without departing from such principles. I claim as my invention all such modifications as come within the true spirit and scope of the following claims.

I claim:

1. A saw chain grinding machine for grinding the depth gauges of saw chain cutter links each having both a front depth gauge and a rear cutter tooth, said machine comprising:

grinding means including a grinding surface;
carrier means for mounting a saw chain with the depth gauge of a selected cutter link in grinding position thereon, said carrier means being movable in a predetermined path to move said cutter link depth gauge toward and away from said grinding means;
mounting means mounting said carrier means and said grinding means for generally vertical relative movement therebetween;
indexing means positioned along said path and cooperable with the cutter tooth to induce generally vertical relative movement between said grinding means and said cutter tooth when said carrier means is moved along said path to determine the grinding position of said grinding surface relative to the depth gauge;
and shield means positioned along said path cooperable with the top of the cutter tooth and the indexing means to prevent any sliding contact with the cutter tooth as said indexing means induces generally vertical relative movement between said grinding means and cutter tooth.

2. A saw chain grinding machine for grinding the depth gauges of saw chain cutter links having cutter teeth adjacent their depth gauges, each such cutter tooth having a top surface sloping downwardly at a back slope angle rearwardly from its said top cutting edge and a clearance between such cutting edge and the top of the depth gauge, said machine comprising:

grinding means including a grinding surface,
carrier means for mounting a saw chain with the depth gauge of a selected cutter link in grinding position thereon, said carrier means and grinding means being mounted for relative movement for moving the cutter link toward and away from said grinding means and thereby the depth gauge into grinding relationship with said grinding surface,
indexing means cooperable with said cutter tooth upon movement of the selected cutter link on said carrier means toward said grinding means to adjust the level of said grinding surface relative to the level of said cutter link and thereby determine the clearance between the top cutting edge and the depth gauge,
and clearance adjustment means cooperable with said indexing means operable automatically to increase said clearance as said cutter tooth becomes shorter.

3. A saw chain grinding machines for grinding the depth gauges of saw chain cutter links having cutter teeth adjacent their depth gauges, each such cutter tooth having a top surface sloping downwardly at a back slope angle rearwardly from its said top cutting edge and a clearance between such cutting edge and the top of the depth gauge, said machine comprising:

grinding means including a grinding surface;

carrier means for mounting a saw chain with the depth gauge of a selected cutter link in a grinding position thereon, said carrier means and grinding means being mounted for relative movement toward and away from each other to position the depth gauge in grinding relationship with said grinding surface; and indexing means cooperable with said cutter tooth and operable during said relative movement for adjusting the level of said grinding surface relative to the level of said cutter tooth and thus the clearance between said top cutting edge and grinding surface.

4. The machine of claim 3 wherein said indexing means automatically increases said clearance proportionately as said cutter tooth becomes shorter.

5. A saw chain grinding machine for grinding the depth gauges of saw chain cutter links having cutter teeth adjacent their depth gauges with top and side cutting edges, each such cutter tooth having a top surface sloping downwardly at a back slope angle rearwardly from its said top cutting edge and a clearance between such cutting edge and the top of the depth gauge, said machine comprising:

grinding means including a grinding surface;

carrier means for mounting a saw chain with the depth gauge of a selected cutter link in a grinding position thereon, said carrier means and grinding means being mounted for relative movement toward and away from each other to position the depth gauge in grinding relationship with said grinding surface; and indexing means cooperable with the side cutting edge of said cutter tooth and operable during said relative movement for adjusting the level of said grinding surface relative to the level of said cutter tooth and thus the clearance between said top cutting edge and grinding surface.

6. The machine of claim 5 wherein said indexing means includes a slidable member having a hook portion on one end engageable with the side cutting edge of a cutter tooth.

7. The machine of claim 6 wherein said hook portion engages said side cutting edge at a point spaced downwardly from said top cutting edge.

8. The machine of claim 5 wherein said indexing means includes a slidable member having a hook portion on one end engageable with the side cutting edge of a cutter tooth, and means associated with said side member for adjusting the level of said grinding surface relative to the longitudinal positioning of said slide member.

9. The machine of claim 5 wherein said indexing means includes a slidable member engageable with the side cutting edge of a cutter tooth and movable with the tooth, said slidable member having a hook portion on one end which engages the tooth, and ramp means associated with said hook portion for adjusting the level thereof and also the said level of said grinding surface relative to the level of the cutter tooth.

10. The machine of claim 5 wherein said indexing means includes engageable means integral with said grinding means, said indexing means also including a slidable member engageable with the side cutting edge of a cutter tooth and movable with the tooth, said slidable member having a hook portion on one end which engages the tooth, and ramp means associated with said hook portion and contactable with said engageable means for adjusting the level thereof and also the said level of said grinding surface relative to the level of the cutter tooth.

11. The machine of claim 10 wherein said machine includes a supporting frame, said ramp means including an inclined surface on said hook portion and on said supporting frame.

12. The machine of claim 5 wherein said indexing means includes a slidable member having a hook portion on one end engageable with the side cutting edge of a cutter tooth, and cam means associated with the other end of said slidable member arranged to longitudinally position said slidable member and its hook portion in selected positions as a result of movement of said carrier means.

13. The machine of claim 5 wherein said indexing means includes a slidable member having a hook portion on one end engageable with the side cutting edge of a cutter tooth, said carrier means being mounted for movement toward and away from said grinding means, said slidable member and said carrier means being supported for unitary movement in a portion of the movement of said carrier means but being supported for relative movement in another portion of movement, and cam means operable between said slidable member and said carrier means arranged to longitudinally position said slidable member and its hook portion in selected positions as a result of the relative movement between said carrier means and said slidable member.

14. The machine of claim 5 wherein said indexing means includes a slidable member having a hook portion on one end engageable with the side cutting edge of a cutter tooth, said indexing means also including lever means operably connected between said slidable member and said grinding means for producing said relative movement between said grinding surface and the cutter tooth.

* * * * *